(12) United States Patent
Ceze et al.

(10) Patent No.: US 8,453,120 B2
(45) Date of Patent: May 28, 2013

(54) ENHANCED RELIABILITY USING DETERMINISTIC MULTIPROCESSING-BASED SYNCHRONIZED REPLICATION

(75) Inventors: Luis Ceze, Seattle, WA (US); Peter J. Godman, Seattle, WA (US); Mark H. Oskin, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 450 days.

(21) Appl. No.: 12/778,058

(22) Filed: May 11, 2010

(65) Prior Publication Data

US 2011/0283262 A1 Nov. 17, 2011

(51) Int. Cl.
*G06F 9/45* (2006.01)
(52) U.S. Cl.
USPC ........... 717/127; 717/124; 717/126; 717/140; 714/36; 714/746; 718/100; 718/102; 719/328
(58) Field of Classification Search
None
See application file for complete search history.

(56) References Cited

U.S. PATENT DOCUMENTS

| | | | |
|---|---|---|---|
| 5,909,559 A | 6/1999 | So | |
| 6,101,524 A | 8/2000 | Choi et al. | |
| 6,298,370 B1 | 10/2001 | Tang et al. | |
| 6,625,635 B1 | 9/2003 | Elnozahy | |
| 6,832,367 B1 | 12/2004 | Choi et al. | |
| 2003/0069920 A1 | 4/2003 | Melvin | |
| 2005/0081103 A1 | 4/2005 | Kadkade | |
| 2005/0081206 A1 | 4/2005 | Armstrong et al. | |
| 2005/0108718 A1 | 5/2005 | Kumar et al. | |
| 2006/0195821 A1 | 8/2006 | Vanspauwen et al. | |
| 2007/0143755 A1 | 6/2007 | Sahu et al. | |
| 2007/0271556 A1 | 11/2007 | Eggers et al. | |
| 2007/0282838 A1 | 12/2007 | Shavit et al. | |
| 2008/0120484 A1 | 5/2008 | Zhang et al. | |
| 2008/0127035 A1 | 5/2008 | Lev et al. | |
| 2008/0162886 A1 | 7/2008 | Saha et al. | |
| 2008/0163220 A1 | 7/2008 | Wang et al. | |
| 2008/0201712 A1 | 8/2008 | Nottingham et al. | |
| 2008/0209436 A1 | 8/2008 | Agha et al. | |
| 2008/0313645 A1 | 12/2008 | Birrell et al. | |
| 2009/0019231 A1 | 1/2009 | Cypher et al. | |
| 2009/0077329 A1 | 3/2009 | Wood et al. | |
| 2009/0077540 A1 | 3/2009 | Zhou et al. | |
| 2009/0165006 A1 | 6/2009 | Ceze et al. | |
| 2009/0172306 A1 | 7/2009 | Nussbaum et al. | |
| 2009/0235262 A1 | 9/2009 | Ceze et al. | |

FOREIGN PATENT DOCUMENTS

| | | |
|---|---|---|
| WO | WO-01/27764 A1 | 4/2001 |
| WO | WO-02/21281 A2 | 3/2002 |
| WO | WO 2007-056597 | 5/2007 |

OTHER PUBLICATIONS

Nettles, Scott M. and Jeannette M. Wing,"Persistence + Undoability = Transactions," School of Computer Science, Carnegie Mellon University, 12 pages, Aug. 30, 1991.

(Continued)

*Primary Examiner* — Isaac Tecklu
(74) *Attorney, Agent, or Firm* — Perkins Coie LLP

(57) ABSTRACT

A hardware and/or software facility for executing a multithreaded program is described. The facility causes each of a plurality of machines to execute the multithreaded program deterministically, such that the deterministic execution of the multithreaded program is replaced across the plurality of machines. The facility detects a problem in the execution of the multithreaded Program by one of the plurality of machines. In response, the facility adjusts the execution of the multithreaded program by at least one of the machines of the plurality.

31 Claims, 15 Drawing Sheets

OTHER PUBLICATIONS

Bacon, D. and Goldstein, S., "Hardware-Assisted Replay of Multiprocessor Programs," Workshop on Parallel and Distributed Debugging, 1991, 13 pages.

Bienia, C. et al., "The PARSEC Benchmark Suite: Characterization and Architectural Implications," Princeton University Technical Report, Jan. 2008, pp. 1-22.

Choi, J. and Srinivasan, H., "Deterministic Replay of Java Multithreaded Applications," Sigmetrics Symposium on Parallel and Distributed Tools, Aug. 1998.

Devietti, et al. "DMP: Deterministic Shared Memory Multiprocessing," University of Washington, May 2008, 22 pages.

Gopal, S. et al., "Speculative Versioning Cache," HPCA, 1998, 11 pages.

Hammond, L. et al., "Data Speculation Support for a Chip Mulitprocessor," ASPLOS, Oct. 1998, pp. 58-69.

Hammond, L. et al., "Transactional Memory Coherence and Consistency," International Symposium on Computer Architecture, 2004, 12 pages.

Herlihy, M. and Moss, J., "Transactional Memory: Architectural Support for Lock-Free Data Structures," International Symposium on Computer Architecture, 1993, pp. 289-300.

Hwu, W. et al., "Implicity Parallel Programming Models for Thousand-Core Microprocessors," DAC, 2007, 6 pages.

International Search Report and Written Opinion; International Patent Application No. PCT/US08/86711; Filed: Dec. 12, 2008; Applicant: University of Washington; Mailed on Jan. 28, 2009, 16 pages.

International Search Report and Written Opinion; International Patent Application No. PCT/US09/36860; Filed: Mar. 11, 2009; Applicant: University of Washington; Mailed on Jul. 2, 2009, 13 pages.

Krishnan, V. and Torrellas, J., "A Chip-Multiprocessor Architecture with Speculative Multithreading," IEEE Transactions on Computers, vol. 48, No. 9. Sep. 1999, pp. 866-880.

Lattner, C. and Adve, V., "LLVM: A Compilation Framework for Lifelong Program Analysis & Transformation," CGO, 2004, 12 pages.

Leblanc, T. and Mellor-Crummey, J., "Debuggin Parallel Programs with Instant Replay," IEEE Transactions on Computers, vol. C-36, No. 4, Apr. 1987, pp. 471-482.

Lee, Edward, "The Problem with Threads," IEEE Computer, May 2006, pp. 33-42.

Luk, C. et al., "Pin: Building Customized Program Analysis Tools with Dynamic Instrumentation," PLDI, Jun. 2005, pp. 1-11.

Narayanasamy, S. et al., "BugNet: Continuously Recording Program Execution for Deterministic Replay Debugging," International Symposium on Computer Architecture, 2005, 12 pages.

Narayanasamy, S. et al., "Recording Shared Memory Dependencies Using Strata," ASPLOS 2006, pp. 229-240.

Rinard, M. and Lam, M., "The Design, Impelmentation, and Evaluation of Jade," ACM Transactions on Programming Languages and Systems, vol. 20, No. 3, May 1998, pp. 483-545.

Ronsse, M. and De Bosschere, K., "RecPlay: A Fully Integrated Practical Record/Replay System," ACM Transactions on Computer Systems, vol. 17, No. 2, May 1999, pp. 133-152.

Sohi, G. et al., "Multiscalar Processors," International Symposium on Computer Architecture, Jun. 1995, pp. 414-425.

Thies, W. et al., "StreamIt: A Language for Streaming Applications," CC, 2002, pp. 1-17.

Woo, S. et al., "The SPLASH-2 Programs: Characterization and Methodological Considerations," International Symposium on Computer Architecture, 1995, pp. 24-36.

Xu, M. et al., "A 'Flight Data Recorder' for Enabling Full-system Multiprocessor Deterministic Replay," International Symposium on Computer Architecture, 2003, 12 pages.

Xu, M. et al., "A Regulated Transitive Reduction (RTR) for Longer Memory Race Recording," ASPLOS, 2006, pp. 49-60.

Supplementary European Search Report, European Patent Application No. 08858537.7; Applicant: University of Washington, dated Feb. 4, 2011, 7 pages.

Bobba et al., Performance Pathologies in Hardware Transactional Memory, ISCA '07, Jun. 9-13, 2007.

Harris et al,. Optimizing Memory Transactions, PLDI '06 Jun. 11-14, 2006.

Larus et al., Transactional Memory, Synthesis Lectures on Computer Architecture #2, copyright 2007 by Morgan & Claypool.

Harris et al., Transactional Memory: An Overview, IEEE Computer Society, May-Jun. 2007.

Larus et al., Transactional Memory, Communications of the ACM, Jul. 2008.

Supplementary European Search Report for Application No. 09719812, mailed Dec. 13, 2011, 11 pages.

ENHANCED RELIABILITY USING DETERMINISTIC MULTIPROCESSING-BASED SYNCHRONIZED REPLICATION

BACKGROUND

Multiprocessing is a mode of operation in which two or more processing units each carry out one or more processes (programs or sets of instructions) in tandem. The objective of a multiprocessing system is to increase processing speed. Typically, this is accomplished by each processing unit operating on a different set of instructions or on different threads of the same process. A process may execute one or more threads. Each thread has it own processor context, including its own program context. Traditionally, for an application to take advantage of the benefits of multiprocessing, a software developer must write the application to be multithreaded. As used herein, a multithreaded application refers to a program capable of running two or more threads simultaneously.

On a multiprocessor or multi-core system (collectively referred to herein as a "multiprocessing system"), two or more of the threads of a multithreaded application may be able to execute at the same time, with each processor or core running a particular thread. It is common for threads of a multithreaded application to share resources during concurrent execution, such as, for example, memory. As used herein, concurrent execution refers to the simultaneous execution of two or more threads of a multithreaded application. A consequence of concurrent execution is that two or more threads of a multithreaded application may read and/or update the same shared resource. For example, one thread may modify a value of a shared memory location while another thread executes a sequence of operations that depend on the value stored in the shared memory location.

Under the traditional software development model, software developers spend a substantial amount of time identifying and attempting to correctly synchronize parallel threads within their multithreaded applications. For example, a developer may explicitly use locks, semaphores, barriers, or other synchronization mechanisms to control access to a shared resource. When a thread accesses the shared resource, the synchronization mechanism prevents other threads from accessing the resource by suspending those threads until the resource becomes available. Software developers who explicitly implement synchronization mechanisms also typically spend a substantial amount of time debugging their synchronization code. However, software defects (referred to as "bugs") resulting from synchronization errors typically manifest themselves transiently (i.e., a bug may appear only on a particular sequence or sequences of interleaved thread operations). As a result, defective software might execute correctly hundreds of times before a subtle synchronization bug appears.

It is difficult to develop software for multiprocessing systems because of the nondeterministic behavior created by the various interleaving of threads on such systems. An interleaving refers to an order of thread operations that may include interaction between threads. The number of possible interleavings between threads significantly increases as the number of threads increase. Consequently, multithreaded applications present additional challenges in terms of error detection and modeling program behavior. For example, given the same input to a multithreaded application, a multiprocessing system will interleave thread operations nondeterministically, thereby producing different output each time the multithreaded application is executed. FIG. 1 is a high-level diagram showing an example of two possible thread interleavings in a multithreaded application executed on a multiprocessing system. As illustrated, the application includes at least two threads: thread 1 and thread 2. When the application is invoked, at some point in time, thread 1 executes an operation settings the value of variable A to one (A=1) followed by an operation settings the value of variable B to the value of variable A (B=A), and thread 2 executes an operation settings the value of variable B to zero (B=0) followed by an operation settings the value of variable A to the value of variable B (A=B). As illustrated, the operations of thread 1 and thread 2 are interleaved nondeterministically, thereby producing different output each time the application is invoked. That is, during the first illustrated invocation, the interleaving of operations resulted in variables A and B each being set to zero, while during the second illustrated invocation, the interleaving of operations resulted in variables A and B each being set to one.

Non-determinism in multithreaded execution may arise from small changes in the execution environment, such as, for example, other processes executing simultaneously, differences in the operating system resource allocation, the state of caches, translation lookaside buffers ("TLBs"), buses, interrupts, and other microarchitectural structures. As a result, developing a multithreaded application is significantly more difficult than developing a single-threaded application.

Conventionally, efforts in addressing this problem have focused on deterministically replaying multithreaded execution based on a previously generated log file. However, deterministic replay systems suffer substantial performance degradation as a result of the overhead associated with maintaining the replay log file. Moreover, with deterministic replay, a software developer does not have control over how the interleaving of threads is performed. As a result, synchronization bugs resulting from particular interleavings of operations may not be identified (and, more importantly, corrected) before the software is deployed to a customer. Non-determinism further complicates the software development process in that non-determinism makes it hard to assess test coverage. Good coverage requires both a wide range of program inputs and a wide range of possible thread interleavings.

BRIEF DESCRIPTION OF THE DRAWINGS

One or more embodiments of the facility are illustrated by way of example and not limitation in the figures of the accompanying drawings, in which like references indicate similar elements and in which.

DETAILED DESCRIPTION

Figure 1:
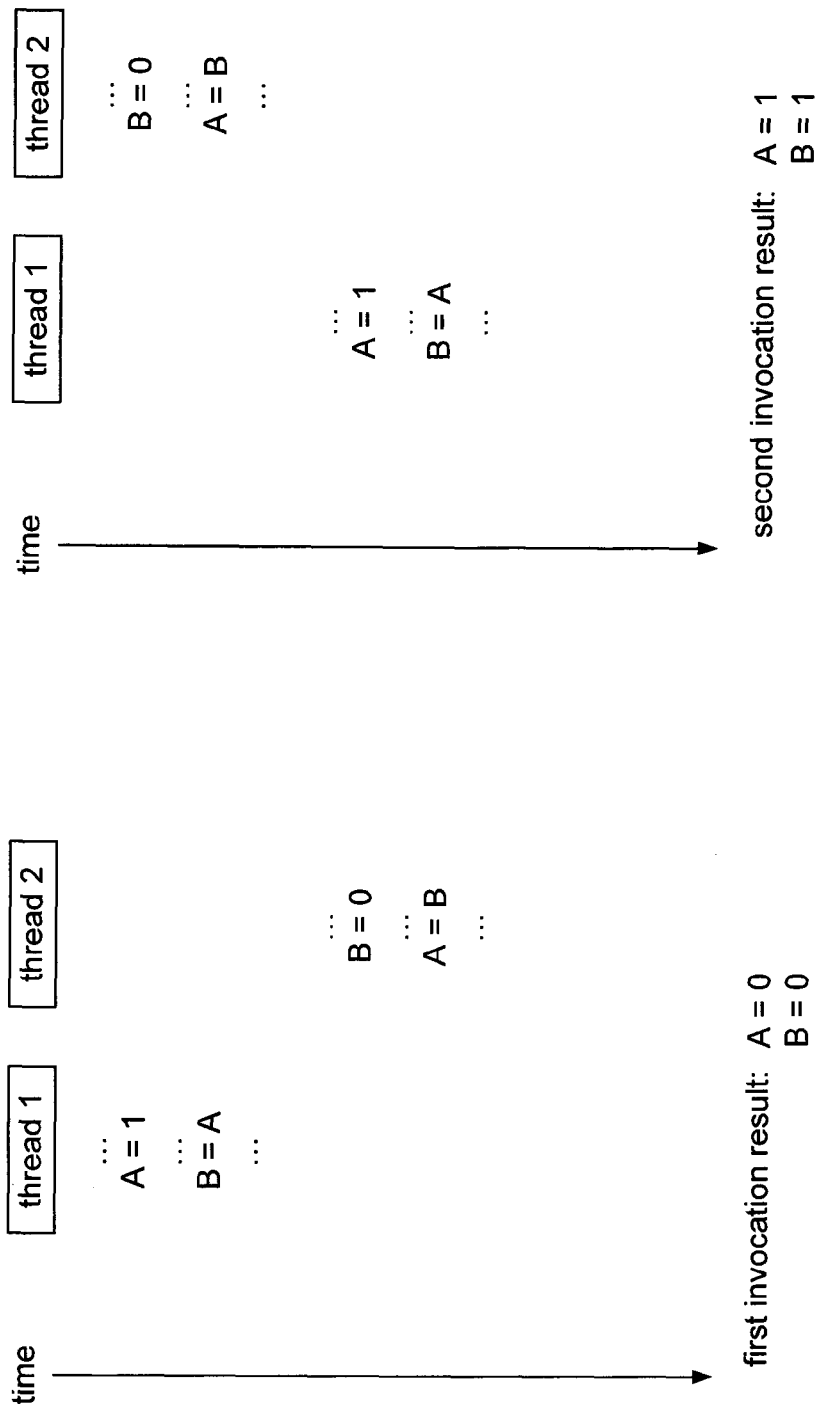
FIG. 1 is a high-level diagram showing an example of two possible thread interleavings in a multithreaded program.

Conventional systems, such as deterministic replay systems, do not adequately resolve the problems associated with the nondeterministic behavior in the development of multi-threaded applications. Additionally, no existing systems reduce or attempt to resolve the problems associated with nondeterministic behavior in the deployment of multi-threaded applications. Accordingly, a hardware and/or software facility for deterministic multiprocessing of multi-threaded applications ("the facility") has been developed. As used herein, the term deterministic multiprocessing refers to a technique by which given the same input to a multithreaded application, the same output is produced by the multithreaded application. The facility simplifies the process of developing multithreaded applications, for example, by freeing developers from the burden of synchronizing thread accesses to shared resources. Additionally, the facility improves the reliability of such multithreaded applications when they are deployed, for example, by enabling developers to reproduce bugs and rigorously test various thread interleavings.

In some embodiments, the facility divides execution of a multithreaded application into sets of a finite, deterministic number of operations (each set is referred to herein as a "quantum"). When identifying quanta, the facility may distinguish between operations that can be performed concurrently, such as communication-free thread operations, and operations that are to be performed in a deterministic order, such as inter-thread communications, system calls, and so on. Each quantum identified by the facility is then performed in a deterministic order. By controlling the order in which quanta are executed by threads of a multithreaded application, the facility enables the multithreaded application to behave deterministically. That is, given the same input, threads of the multithreaded application interleave their operations deterministically, thereby providing the same output.

In some embodiments, the facility serializes execution of a multithreaded application. That is, the facility may control the global interleaving of all thread operations. For example, this may be accomplished by establishing a memory access token that is passed in a deterministic order between threads. A thread may be referred to as "holding" the token when the value of the token matches the identifier of that thread. When the value of the token does not match the identifier of a thread, its execution is suspended until the value of the token matches the identifier of the thread. When the value of the token matches the identifier of a thread, the thread performs a finite, deterministic number of operations (i.e., a quantum) before the token is passed to the next thread. The token may be passed to the next thread, for example, by advancing the value of the token to correspond to the identifier of the next thread in the deterministic order.

In some embodiments, the facility uses deterministic multiprocessing to synchronize the execution of a multi-threaded program on two or more separate peer machines. As is discussed in detail below, doing so provides an extra measure of reliability and/or performance in many cases relative to executing the same multi-threaded program on a single system.

Figure 2:
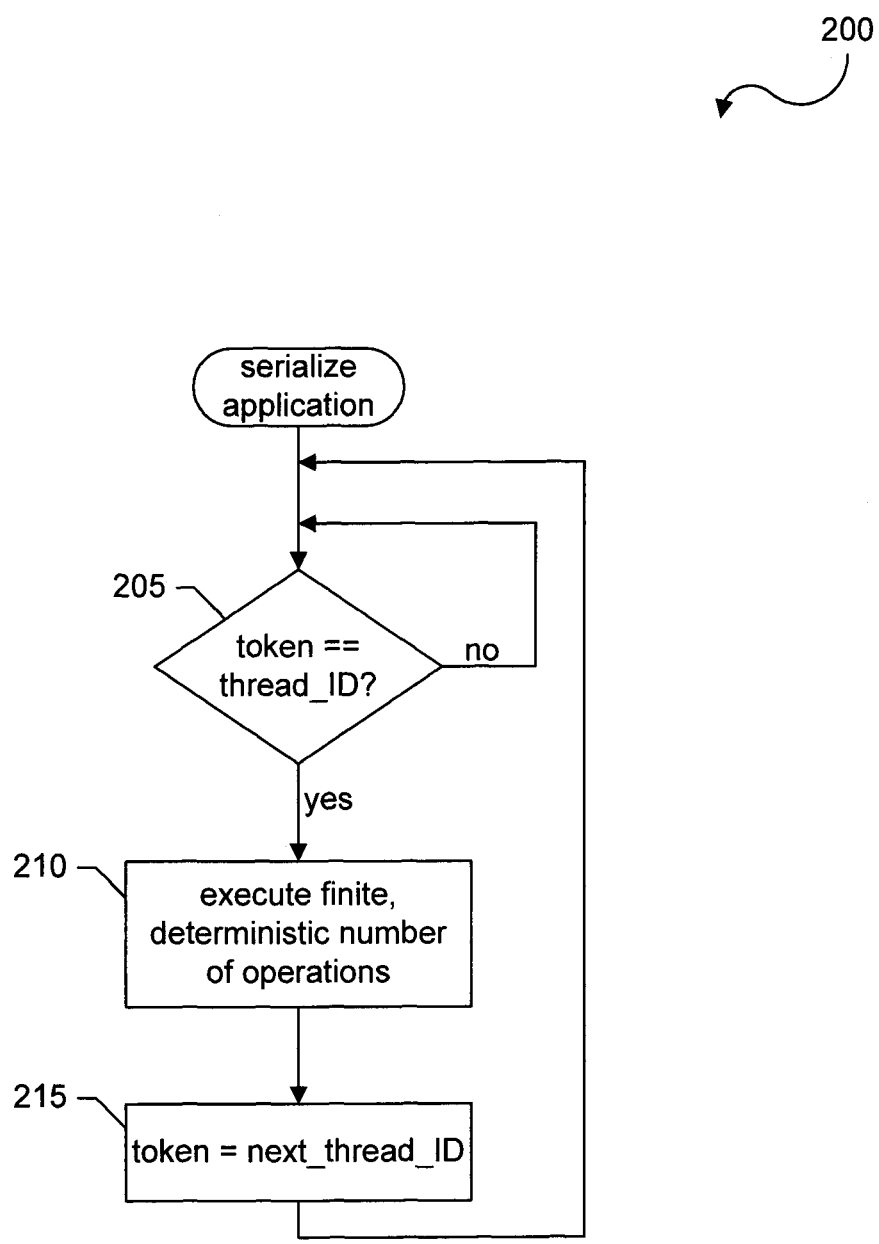
FIG. 2 is a flow diagram of a deterministic serialization process performed by the facility in one or more embodiments.

FIG. 2 is a flow diagram of a deterministic serialization process 200 performed by the facility in one or more embodiments. For example, the deterministic serialization process 200 may be performed while a multithreaded application executes on a multiprocessing system. While the multi-threaded application executes, the facility loops through steps 205-215 for each thread. In step 205, if the facility determines that the value of the token matches the identifier of a thread, then the facility continues to step 210, else the facility loops back to step 205. That is, the facility suspends execution of the thread until the value of the token matches the identifier of that thread. In step 210, the facility allows the thread whose identifier matches the token to execute a finite, deterministic number of operations (i.e., a quantum), then the facility continues to step 215. In step 215, the facility sets the value of the token to equal the identifier of the next thread in the deterministic order, then the facility continues to step 205. It is noted that the facility may continue looping through the serialization process 200 until the application exits.

Those skilled in the art will appreciate that the steps shown in FIG. 2 and in each of the following flow diagrams may be altered in a variety of ways. For example, the order of certain steps may be rearranged; certain sub-steps may be performed in parallel; certain shown steps may be omitted; or other steps may be included; etc.

In some embodiments, the facility selectively serializes execution of a multithreaded application. That is, the facility may control the interleaving of certain thread operations (referred to herein as "controlled operations"), while other thread operations are performed concurrently. For example, the facility may control the interleaving of operations that involve communication between two or more threads. Inter-thread communication occurs when a thread reads data that is privately held by another thread, or when a thread writes to shared data, thereby privatizing it. In some embodiments, when a thread attempts to read data that is regarded as privately held by another thread, the thread suspends its execution until the value of the token matches its identifier. Similarly, in some embodiments, when a thread attempts to write to data that is shared or regarded as privately held by another thread, it suspends its execution until the value of the token matches its identifier and all other threads reach a deterministic point in their execution (e.g., complete execution of a quantum). As a result, the facility ensures that all threads observe the change in state of the data (from shared to privately held by the thread) at a deterministic point in their execution.

In some embodiments, to detect inter-thread communication, the facility maintains a shared-memory data structure that includes sharing information for each memory location in the address space of the multithreaded application. For example, such information may indicate that a memory location is shared, private, etc. It is noted that sharing may occur at different levels, such as the operation-level, instruction-level, page-level, and so on. In some embodiments, a thread may access its own privately held data or read shared data without holding the token. However, to write to shared data or read data that is held as private by another thread, the thread waits until it holds the token and all other threads are blocked (i.e., are also waiting for the token). When a thread reads a memory location that is regarded as private, the shared-memory data structure is updated to indicate that the read memory location is to be regarded as shared. When a thread writes to a memory location, the shared-memory data structure is updated to indicate that the memory location is to be regarded as privately held by that thread. Similarly, when a thread reads a memory location that has not been previously accessed by another thread, the shared-memory data structure is updated to indicate that the memory location is to be regarded as privately held by that thread.

Figure 3:
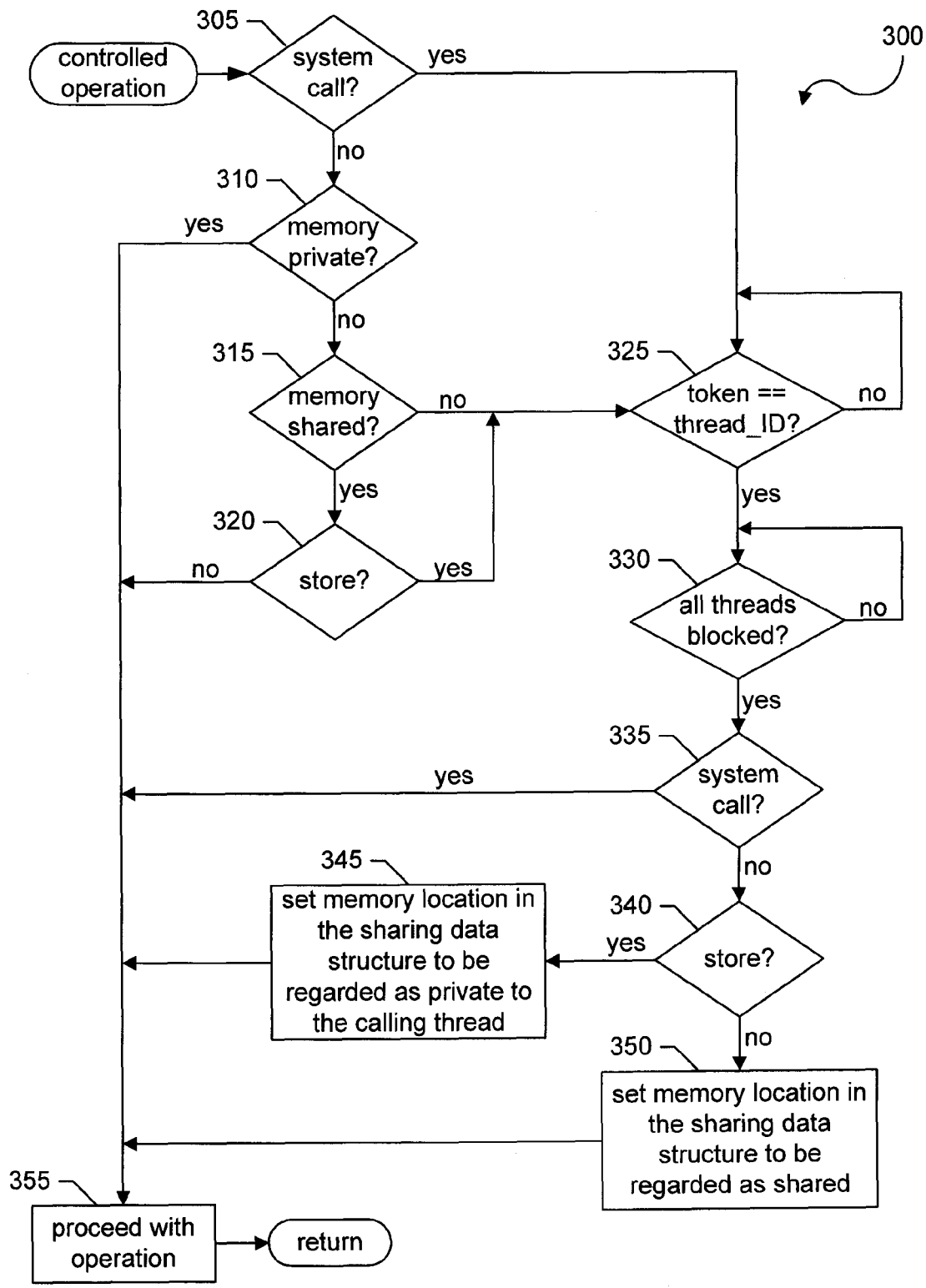
FIG. 3 is a flow diagram of a deterministic selective serialization process performed by the facility in one or more embodiments.

FIG. 3 is a flow diagram of a deterministic selective serialization process 300 performed by the facility in one or more embodiments. For example, the selective serialization process 300 may be performed when a thread or processor attempts to perform a controlled operation, such as memory operations, system calls, etc. In step 305, if the facility determines that the operation is a system call (e.g., an I/O operation, etc.), then facility continues to step 325, else the facility continues to step 310. In step 310, if the facility determines that the operation accesses memory that is not privately held by the thread, then the facility continues to step 315, else the facility continues to step 355. In step 315, if the facility determines that the operation accesses shared memory, then the facility continues to step 320, else the facility continues to step 325. In step 320, if the facility determines that the operation is a store operation, then the facility continues to step 325, else the facility continues to step 355. In step 325, if the facility determines that the value of the token matches the identifier of the thread, then the facility continues to step 330, else the facility loops back to step 325. That is, the facility suspends execution of the selected thread until the value of the token matches the identifier of the selected thread. In step 330, if the facility determines that all threads of the multithreaded application are suspended (or blocked), then the facility continues to step 335, else the facility loops back to step 330. By waiting for all threads to be suspended before the thread holding the token may execute, the facility ensures that, at a deterministic point in their execution, all threads observe any state change that results from execution of the operation. In step 335, if the facility determines that the operation is a system call, then the facility continues to step 355, else the facility continues to step 340. In step 340, if the facility determines that the operation is a store operation, then the facility continues to step 345, else the facility continues to step 350. In step 345, the facility updates the shared memory data structure to indicate that the memory location affected by the operation is to be regarded as privately held by the thread, then the facility continues to step 355. In step 350, the facility the updates the shared memory data structure to indicate that the memory location accessed by the operation is to be regarded as shared, then the facility continues to step 355. In step 355, the facility allows the thread to proceed with the operation, then the facility returns.

In some embodiments, the facility operates together with a transactional memory system to serialize or selectively serialize execution of a multithreaded application. For example, the facility may use the transactional memory system to detect inter-thread communication that would violate the deterministic ordering of memory operations. That is, the transactional memory system may be used instead of, or in addition to, the shared-memory data structure. It is noted that the transactional memory system may be a hardware transactional memory (HTM) system, a software transactional memory (STM) system, or a hybrid hardware-software transactional memory system (HS-TM). When operating together with a transactional memory system, the facility encapsulates each quantum executed by a thread within a transaction. By encapsulating each quantum within a transaction, the threads appear to execute atomically and in isolation. As a result, transactions may be executed concurrently, and then committed according to a deterministic order. A transaction is typically not committed if the transaction includes an inter-thread communication that would violate the deterministic ordering (referred to herein as a "conflict"). When a conflict exists, the transaction is aborted and restarted.

In some embodiments, the facility includes a quantum builder component and a deterministic multiprocessing ("DMP") component. The quantum builder component is used to divide execution of a multithreaded application into quanta (i.e., sets of a finite, deterministic number of operations). In some embodiments, the quantum builder component distinguishes between operations that may be performed concurrently, such as communication-free thread operations, and operations that are to be performed in a deterministic order (e.g., controlled operations), such as inter-thread communications, system calls, and so on. The DMP component ensures that each quantum is performed according to a deterministic order. In some embodiments, when the token is advanced to a thread that is blocked (e.g. waiting for a lock held by another thread), the facility passes the token to the next thread, thereby avoiding livelock resulting from blocking synchronization primitives that a developer included within the multithreaded code. For example, if thread 1 holds a lock that thread 2 requires to proceed at the time that the token is passed to thread 2, then the token is passed to the next thread (e.g., thread 3), and so on. Because the token is passed in a deterministic order, and because each thread executes a quantum (or passes the token), the quanta are interleaved deterministically, thereby producing the same output each time the code is executed with the same input and preventing livelock.

The quantum builder component and DMP component may be implemented in hardware, software, or a combination of hardware and software. For example, the quantum builder component may be implemented by counting instructions as they retire and placing a quantum boundary when the predetermined quantum size is reached. To serialize execution, the DMP component may be implemented as a token that is passed between processors at a quantum boundary in a deterministic order. As another example, to selectively serialize execution, the quantum builder component may monitor memory accesses to determine whether an access involves inter-thread communication (e.g., access to shared data, etc.). For example, in one embodiment, the quantum builder uses a cache line state maintained by a MESI ("Modify, Exclusive Share, Invalidate") cache coherence protocol to implement a sharing table. A cache line in an exclusive or modified state is regarded as privately held by a processor, and can be freely read or written by its owner thread without holding the token. Similarly, a cache line in a shared state may be freely read by its owner thread without holding the token. The processor may write to a cache line in a shared state when all threads are at a deterministic point in their execution (e.g., when all processors are blocked) and when the processor acquires the deterministic token. In such embodiments, each processor broadcasts when it is blocked and/or unblocked. It is noted that the state of entries in the sharing table corresponding to lines that are not cached by any processor may be kept in memory and managed by a memory controller, and that the state of such entries may be transferred when cache misses are serviced. In some embodiments, the quantum builder and DMP components operate together with a transactional memory (TM) system, such as a hardware transactional memory (HTM) system, to specify a specific transaction commit order—the deterministic commit order of quanta encapsulated inside transactions. In such embodiments, the TM system commits a transaction when the processor holds the token and, after the transaction is committed, the token is passed to the next processor in the deterministic order. It in noted that, in some embodiments, the hardware may support multiple tokens, thereby allowing multiple deterministic processes to execute at the same time, each process specifying a token that is passed between processors.

In some embodiments, the facility may be implemented using a compiler or a binary rewriting infrastructure. For example, the quantum builder component may use a compiler to build quanta by inserting synchronization code within multithreaded application code to track operations in the control-flow-graph ("CFG") generated by the complier. It is noted that quanta need not be of uniform size as long as the size is deterministic. Such synchronization code may be inserted, for example, at the beginning and end of function calls, and at the tail end of CFG back edges. The inserted code tracks quantum size and when the target size has been reached, it calls back to the DMP component. For example, to serialize execution such embodiments, the DMP component may implement the token as a queuing lock that is passed between threads in a deterministic order. As another example, to selectively serialize execution, the quantum builder component may use the compiler to insert code such that load and store operations result in a callback to the DMP component. In some embodiments, the DMP component operates together with a transactional memory system, such as software transactional memory (STM) system, and/or implements a sharing table.

In some embodiments, to control the interleaving of operations performed by threads, the facility may augment source code, an intermediate representation of source code, or an executable. For example, the facility may augment multithreaded application code by inserting one or more deterministic multiprocessing ("DMP") functions or data structures into the application code. As another example, the inserted DMP functions may call back to a runtime system, such as that provided by the DMP component, which maintains one or more data structures (e.g., a shared memory data structure). When the augmented code is executed by a multiprocessing system, the inserted DMP functions and data structures are then used to control the order in which operations are performed, such as memory and I/O operations, system calls, and so on. By controlling the order in which threads perform such operations, the facility enables the multithreaded application to behave deterministically (referred to herein as an "augmented application"). That is, given the same input, threads of an augmented application may interleave some or all of their operations deterministically, thereby providing the same output. Those skilled in the art will appreciate that the facility may be extended to control other thread operations.

In some embodiments, the facility is implemented as a compiler module that augments multithreaded application code by inserting functions provided by a DMP library, which enforce deterministic execution of quanta performed by threads of the augmented application. In some embodiments, after the code is augmented, a compiler re-optimizes the code, such as, for example, inlining all calls to the DMP library. Those skilled in the art will appreciate that the compiler may perform other optimizations to the augmented code not specifically described herein.

Figure 6:
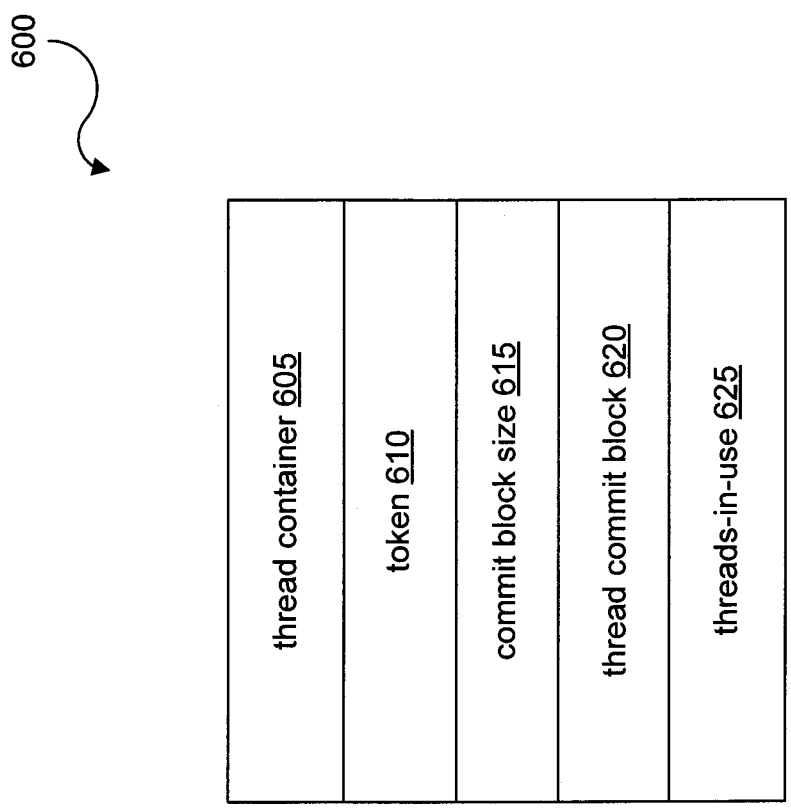
FIG. 6 is a high-level block diagram showing a data structure used by the facility to make multiprocessor code deterministic in one or more embodiments.

In some embodiments, the facility includes a DMP data structure, referred to herein as a "thread data structure," the details of which are discussed in greater detail below in connection with FIG. 6. However, it is noted that any number of DMP data structures may be included. It is further noted that the thread data structure may represent multiple DMP data structures. In some embodiments, the thread data structure stores a thread identifier ("ID") corresponding to each thread that is created by the augmented application during execution. For example, the thread data structure may include an array, linked list, a queue or other data structure of thread IDs (referred to herein as a "thread container").

In some embodiments, the thread data structure includes a token that may be used to control the order of quantum execution. For example, in some embodiments, prior to executing a quantum, a thread determines whether the current value of the token matches the ID of the thread. When the ID of a thread matches current value of the token, the thread may execute the quantum. Otherwise, the thread waits to execute the quantum until the current value of the token matches its identifier.

In some embodiments, the order in which threads are created corresponds to the order in which the threads are deterministically executed. For example, as each thread is created, the thread's corresponding thread ID may be sequentially stored in the thread container (e.g., a thread ID of 1 for the first-created thread; a thread ID of 2 for the second-created thread; etc.). As operations are executed, the threads may invoke certain DMP functions that operate to advance the value of the token by sequentially looping through the thread IDs stored in the thread container based on the sequence in which the thread IDs were stored (beginning with the first thread ID). It is noted that, when a thread exits, the thread's corresponding ID is typically removed from the thread container.

In some embodiments, the thread data structure stores a value corresponding to a finite, deterministic number (i.e., quantum) of controlled operations or blocks that may be executed by a thread whose thread ID matches the current value of the token before the token is advanced. This number of controlled operations or blocks is referred to herein as the "commit block size." The commit block size may range from one to N controlled operations or blocks. Those skilled in the art will appreciate that there are performance tradeoffs associated both large and small commit block sizes. For example, when the commit block size is too small, the performance of the augmented application will suffer as a result of the overhead associated with context switches between threads. As another example, when the commit block size is too large, the performance of the augmented application will suffer because many or all threads may be forced to wait for the thread whose thread ID matches the token (and every thread whose thread ID precedes its thread ID) to exit or actually execute the number of controlled operations specified by commit block size. In at least one embodiment, the commit block size is equal to one thousand (10,000).

In some embodiment, the commit block size is configurable. For example, the commit block size may be configured by a software developer to programmatically manipulate and test the various thread interleavings of an augmented application. As another example, the commit block size may be automatically configured based on the maximum number of threads that may be created by the augmented application and/or the number of processor or cores of the multiprocessing system on which the augmented application executes. Those skilled in the art will appreciate that a variety of techniques may be used to count the number of controlled operations performed by a thread. For example, in some embodiments, the thread data structure includes a value corresponding to the number of controlled operations that have been performed by a thread whose thread ID matches the current token ID. Each time the thread performs a controlled operation, the number of controlled operations in incremented, and the compared to the commit block size. If the number of controlled operation equals the commit block size, then the token is advanced to the next thread ID, and the number of controlled operations is reset to zero.

By augmenting a multithreaded application to control the ordering of certain thread operations (such as, e.g., controlled thread operations), the development process is substantially simplified. For example, the facility can be used by a software developer to directly manipulate thread interleavings of a multithreaded application, thereby allowing for substantially better test coverage of the multithreaded application. A developer may manipulate the interleavings of controlled thread operations, for example, by modifying the commit block size. As another example, a developer may manipulate the interleavings of controlled thread operations by modifying the ordering of thread IDs stored in the thread container. In some embodiments, the facility enables a software developer to mark code as being inserted for augmentation purposes, such that the inserted code will not affect quantum building.

In some embodiments, a multithreaded application is deployed in its augmented form. By deploying a multithreaded application in its augmented form, the reliability of the application is substantially increased because, for example, the execution of the augmented application "in the field" (i.e., by a customer) will more closely resemble in-house testing of the application. Additionally, if the augmented application were to crash or experience a synchronization bug, a software developer may quickly resolve the defect by collecting meaningful crash information from the customer. That is, when deployed in its augmented form, the actions performed by the customer that preceded the crash are meaningful because they allow the software developer to easily reproduce the crash. As a result, the software developer can resolve the defect substantially faster than if the crash or synchronization bug were associated with an unknown interleaving of threads. Accordingly, the facility improves both the development and deployment of multithreaded applications.

In some embodiments, the computing system on which a multithreaded application is developed, and/or on which the multithreaded application is deployed, includes a transactional memory ("TM") system for controlling access to shared memory. The transactional memory system may be a hardware transactional memory ("HTM"), a software transactional memory ("STM") system, or a hybrid hardware-software (HS-TM) system. Both TM systems are known in the art. A STM system provides a programming abstraction through which a thread atomically performs a sequence of operations, some of which may involve one or more shared resources (e.g., memory), without locking or waiting for a shared resource to be freed.

Conventional TM systems are "optimistic" in the sense that a thread completes modifications to shared memory without regard for what other threads might be doing. This is accomplished, for example, by maintaining a log for each thread of a multithreaded application and, for each transaction, each thread sequentially record its operations in its corresponding log. For example, a log may include a number of memory locations and values that a thread reads and/or writes during a transaction. At the end of the transaction, if no other thread has concurrently accessed the same shared memory locations, the thread actually performs the sequence of operations (this is commonly referred to as a "commit"). However, if another thread has concurrently accessed one or more of the same memory locations, then the transaction is aborted and restarted. That is, in conventional TM systems, transactions execute concurrently so long as a shared resource is not accessed by more than one thread during the same transaction.

There are a number of disadvantages associated with conventional TM systems. For example, although conventional TM systems somewhat simplify development by allowing developers to declare certain operations or certain sequences of operations as atomic, conventional TM systems do not provide deterministic multiprocessing of multithreaded applications. Additionally, conventional TM systems do not allow software developers to specify or manipulate the interleavings of threads in a multithreaded application. As a result, conventional TM systems also suffer from latent synchronization bugs. Also, compared with HTM systems, STM systems suffer a performance hit as a result of the overhead associated with maintaining a log and the time spent committing transactions.

In some embodiments, the facility controls the order of execution of certain thread operations of a multithreaded application that uses a transactional memory system to control access to shared resources, such as a HTM, STM, or HS-TM system. That is, the facility may control the order in which threads begin and/or commit transactions in a transactional memory system. In some embodiments, the facility augments an application programming interface ("API") provided by a STM system. As one example, the facility may augment the functions of the STM API provided in Table 1 below. It will be appreciated by those skilled in the art that, although some embodiments of the facility are described with reference to the STM API provided in Table 1, the facility may operate on various transactional memory systems.

TABLE 1

| | |
|---|---|
| void STMBeginTransaction( ): | begins a new transaction performed by a thread |
| value STMRead(*addr): | records information in a log about the operation type, address, and/or current value of the shared memory location |
| void STMWrite(*addr, value): | records information in a log about the operation type, address, and/or current value of the shared memory location as a result of the operation |
| bool STMValidTransaction ( ): | determines, based on a thread's log, whether another thread has concurrently accessed one or more of the same shared resources |
| void STMAbortTransaction( ): | aborts a transaction performed by a thread |
| bool STMCommitTransaction( ): | commits a transaction performed by a thread |

In some embodiments, a software developer manually specifies atomic blocks within a multithreaded application. For example, a software developer may include the following atomic block:

```
atomic {
    a = b + c;
}
```

Following compilation, the above example atomic block would be replaced by the following pseudo code:

```
STM_Begin_Transaction( );
try {
    var_1 = STMRead(*b);
    var_2 = STMRead(*c);
    STMWrite(*a, var_1 + var_2);
    bool transaction_valid = STMValidTransaction( );
    if (!STMValidTransaction( )) {
        STMAbortTransaction( );
    }
    else if (STMValidTransaction( )) {
        bool transaction_commited = STMCommitTransaction( );
        if (!transaction_commited) {
            throw transaction_failed_to_commit;
        }
    }
}
catch (transaction_failed_to_commit)
{
    ...
}
```

In some embodiments, one or more of the transactions (i.e., atomic blocks) are not visible to the software developer. For example, they may be inserted by the compiler, runtime, TM system, or some combination of thereof. In some embodiments, atomic blocks are augmented irrespective of whether the blocks were specified by a software developer or inserted by the compiler, runtime, or TM system. In some embodiments, when a thread calls an augmented function of the STM API, the function transfers control to a DMP function that checks the corresponding thread ID to the current value of a token, which is used to start and/or commit transactions deterministically. One skilled in the art will appreciate that many different techniques may be used to intercept transactions. For example, some STM APIs provide a callback mechanism through which hooks may be registered to transfer control to a DMP function before and/or after an API function is performed.

Transactions of an augmented transactional memory system are deterministic in size. That is, each thread executes a specific number of operations on blocks (referred to herein as the "commit block size"), and then the threads deterministically attempt to commit, starting with the thread whose ID matches the current value of the token. If a transaction is valid and the thread ID matches the token, then the thread calls STM_Commit_Transaction( ). After a transaction is committed, the token is advanced to the next thread ID. However, if the transaction is invalid (for example, because the thread read from a location written by another thread during that transaction), then the thread calls STM_Abort_Transaction( ). It is noted that the token is typically not advanced until the thread whose thread ID matches the token successfully commits its corresponding transaction.

In some embodiments, certain types of operations will cause a transaction to immediately abort if the current value of the token does not match the thread ID of the thread executing the transaction. For example, when a transaction includes an operation that cannot be undone, such as an I/O operation, the thread executing the transaction determines whether its thread ID matches the token. If its thread ID matches the token, then the transaction may proceed. Otherwise, the transaction may be automatically aborted.

In some embodiments, all threads having thread IDs subsequent to an aborted thread are aborted, while in other embodiments only those threads whose concurrent transactions accessed the same shared resource are aborted and restarted. The token is typically not advanced until the thread whose thread ID matches the token successfully commits its corresponding transaction. As a result, any threads having thread IDs subsequent to an aborted thread, which did not abort their transactions, will wait for the token to match their thread IDs before calling STM_Commit_Transaction( ).

It is noted that when an augmented application is executed on a computing system having HTM, the augmented application can be executed deterministically with no substantial performance penalty. As a result, software developers and/or manufacturers can deploy their multithreaded applications knowing that they have thoroughly tested for likely thread interleaving. Thus, even if synchronization bugs remain in the multithreaded code, they will not appear to the customer.

Figure 4:
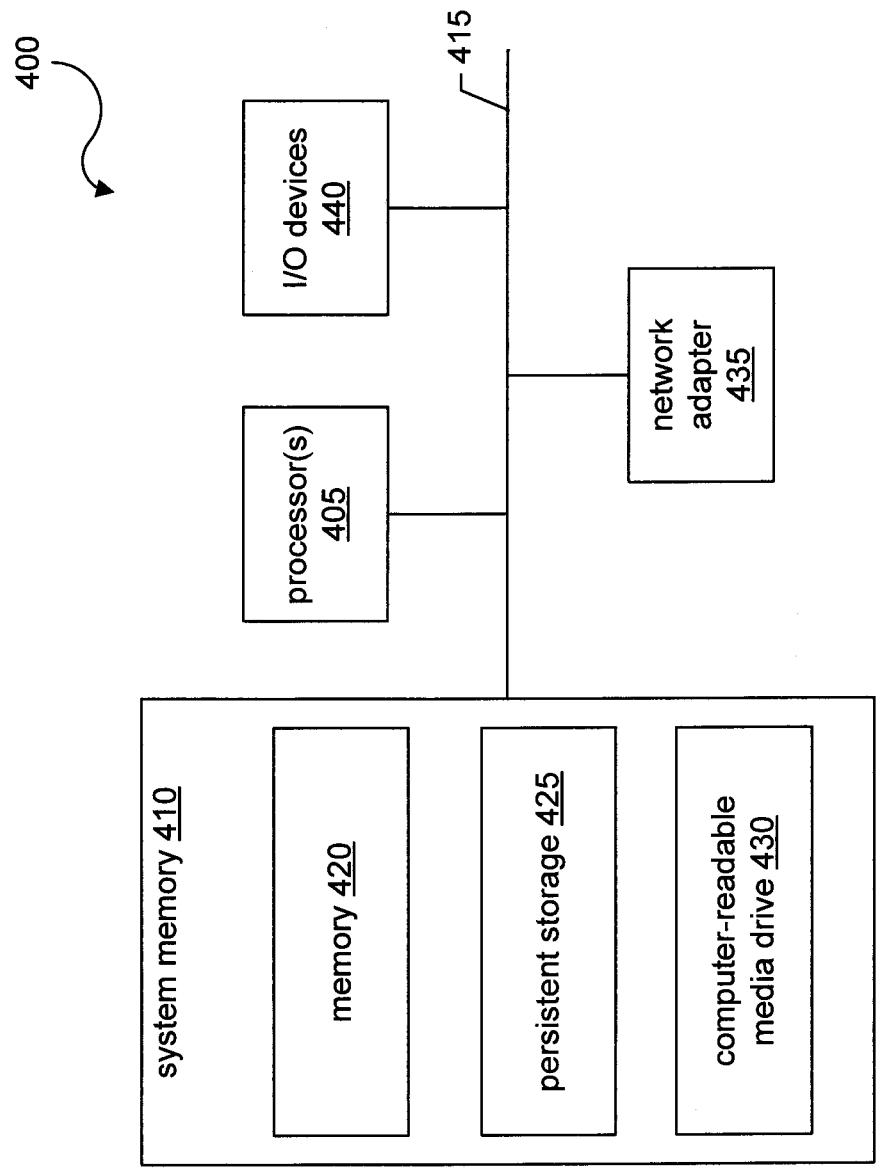
FIG. 4 is a high-level block diagram showing an example architecture of a computing system on which the facility executes in one or more embodiments.

Before describing the facility in greater detail, it is useful to consider an environment in which the facility can be implemented. FIG. 4 is a high-level block diagram showing an example architecture of a computing system 400 on which the facility executes in one or more embodiments. Certain well-known structures and functions have not been shown or described in detail to avoid obscuring the description. The computing system 400 includes one or more processors 405 and memory 410 coupled to an interconnect system 415. The processors 405 are the central processing units ("CPUs") of the computing system 400 and, thus, control its overall operation. In some embodiments, the processors 405 accomplish this by executing software stored in memory 410. In some embodiments, the computing system 400 includes a processor 405 having two or more independent cores in a package composed of a single integrated circuit (referred to as a "die"), one or more dies packaged together, multiple packages, and so on. In some embodiments, the computing system 400 includes a hyper-threaded processor 405 that, despite having only a single core, is capable of performing as a multi-core processor. A processor 405 may be, or may include, one or more programmable general-purpose or special-purpose microprocessors, digital signal processors ("DSPs") programmable controllers, application specific integrated circuits ("ASICs"), programmable logic devices ("PLDs"), or the like, or a combination of such devices.

The interconnect system 415 shown in FIG. 4 is an abstraction that represents any one or more separate physical buses and/or point-to-point connections, connected by appropriate bridges, adapters and/or controllers. The interconnect system 415 may include, for example, a system bus, a form of Peripheral Component Interconnect (PCI) bus, a HyperTransport or industry standard architecture (ISA) bus, a small computer system interface (SCSI) bus, a universal serial bus (USB), an Institute of Electrical and Electronics Engineers (IEEE) standard 1394 bus (sometimes referred to as "Firewire"), and so on.

System memory 410 includes a memory 420 for storing programs and data while they are being used; a persistent storage device 425, such as a hard drive, for persistently storing programs and data; and a computer-readable media drive 430, such as a CD-ROM or DVD-ROM drive, for reading programs and data stored on a computer-readable medium. As used herein, system memory 410 includes any form of volatile, nonvolatile, removable, and non-removable media, or any combination of such media devices that are capable of storing information such as computer-readable instructions, data structures, program modules, and other data of the computing system 400.

Also connected to the processors 405 through the interconnect system 415 is a network adapter 435 and one or more input devices and output devices ("I/O devices") 440. The network adapter 435 provides the computing system 400 with the ability to communicate with other computing systems over a network and may be, for example, an Ethernet adapter. The I/O devices 440 provide a user of the computing system 400 with the ability to access programs and data stored in system memory 410. For example, I/O devices 440 may include input devices such as a keyboard, pointing device, microphone, etc., and output devices such as a display device, speakers, a printer, and so on. While computing systems configured as described above are typically used to support the operation of the facility, those skilled in the art will appreciate that the facility may be implemented using devices of various types and configurations, and having various components.

Figure 5:
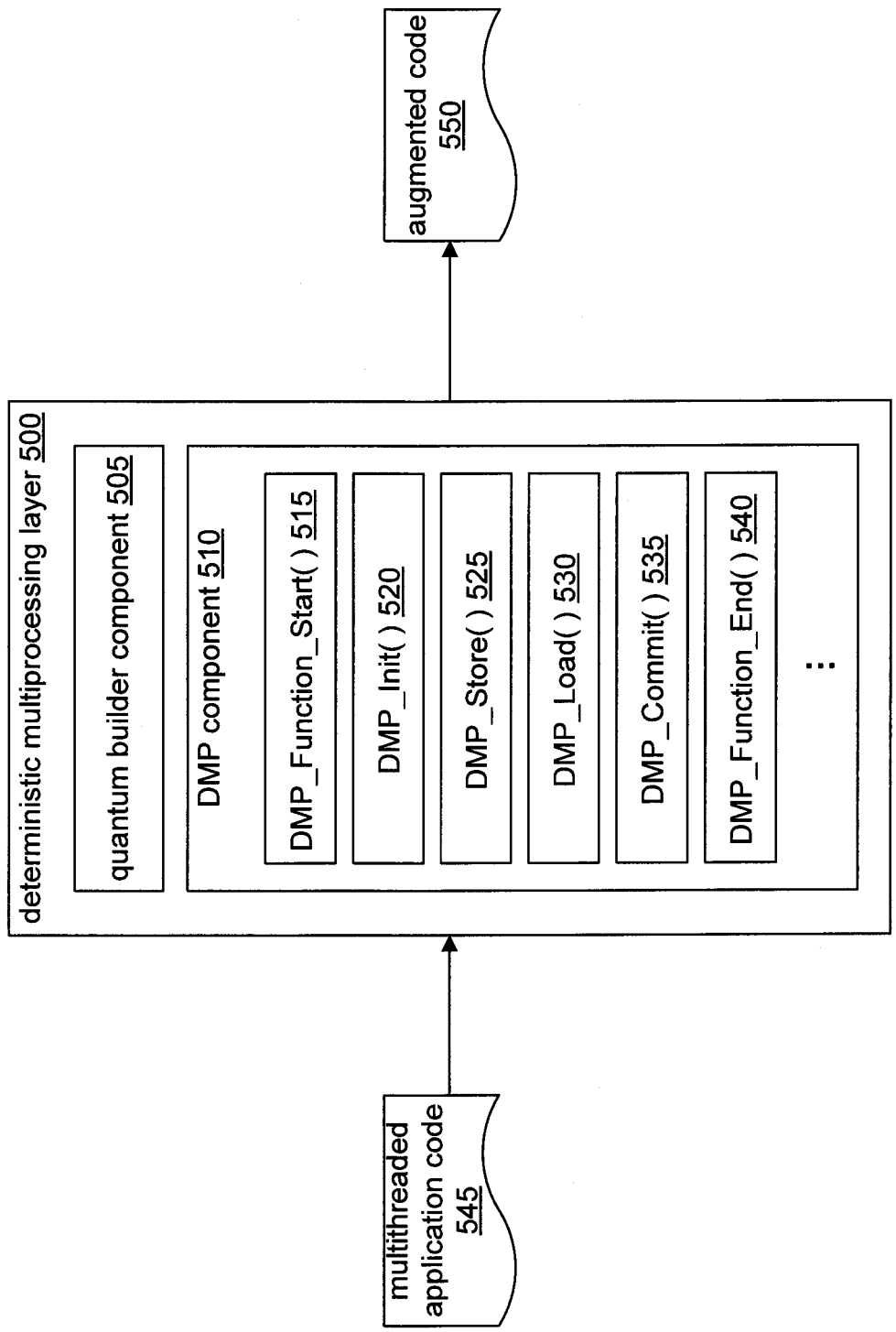
FIG. 5 is a high-level block diagram showing various functional elements of a deterministic multiprocessing layer in one or more embodiments.

FIG. 5 is a high-level block diagram showing various functional elements of a deterministic multiprocessing layer 500 in one or more embodiments. It is noted that the deterministic multiprocessing layer 500 does not have to be implemented by the computing system 400. For example, in some embodiments, the deterministic multiprocessing layer 500 is implemented in a separate computing system to which multi-threaded software code is provided as input.

In some embodiments, the deterministic multiprocessing layer 500 includes a quantum builder component 505 and a deterministic multiprocessing ("DMP") component 510. The quantum builder component 505 may be implemented, for example, as a compiler module that augments code of a multithreaded application 545 using one or more of the functions 515-540 provided by the DMP component 510. Those skilled in the art will appreciate that the functions provided by the DMP component 510 may be altered in a variety of ways. For example, certain functions may be merged together or divided; certain functions may be omitted; certain functions may be added; and so on. In some embodiments, the quantum builder component 505 is implemented as a compiler pass within a compiler infrastructure, such as, for example, within the low level virtual machine ("LLVM") compiler infrastructure. While in other embodiments, the quantum builder component 505 is implemented by a separate system to which the multithreaded application code 545 is provided as input.

In the illustrated embodiment, the deterministic multiprocessing layer 500 receives and/or accesses the multithreaded application code 545. It is noted that multithreaded application code 410 may represent one or more code files. The code 545 may be the source code of a multithreaded application, an intermediate representation ("IR") of the source code of a multithreaded application, the executable of a multithreaded application, and so on. In some embodiments, the quantum builder component 505 may use a compiler to build quanta by inserting synchronization code within the multithreaded application code 545 to track operations in the control-flow-graph ("CFG") generated by the complier. The inserted code tracks quantum size and, when the quantum size has been reached, it calls one or more functions provided by the DMP component 510 to control the forward progress of threads within the application. The DMP component 510 may provide a runtime system and/or one or more of the DMP functions 515-540 may be inserted into the code 545. In some embodiments, the deterministic processing layer 500 operates together with a transactional memory system and/or implements a sharing table.

In the illustrated embodiment, the DMP library includes a DMP start function ("DMP_Function_Start( ) function 515"), a DMP initialization function ("DMP_Init( ) function 520"), a DMP store function ("DMP_Store( ) function 525"), a DMP load function ("DMP_Load( ) function 530"), a DMP commit function ("DMP_Commit( ) function 535"), and a DMP end function ("DMP_Function_End( ) function 540"). The DMP start function 515 and end function 540 may be used to demarcate when an application function starts and ends. The DMP load function 530 may be used to convey to the deterministic multiprocessing layer 500 that a load operation will be, or has been, executed. Similarly, the DMP store function 525 may be used to convey to the deterministic multiprocessing layer 500 that a store operation will be, or has been, executed. The DMP store and load functions 525 and 530 are used to control the order of memory operations and thereby enforce deterministic execution of such operations. The DMP initialization function 520 and the DMP commit function 535 may be used to demarcate a block of code that is used to control the order of memory operations or to start or end a transaction. Those skilled in the art will appreciate that the functions provided by the DMP component 510 may be altered in a variety of ways. For example, certain functions may be merged together or divided; certain functions may be omitted; certain functions may be added; and so on.

In some embodiments, the quantum builder component 505 inserts the function 515-540 of the DMP component 510 as listed in table 2 below:

TABLE 2

| | |
|---|---|
| DMP_Function_Start( ) - | inserted at the start of each function included in code 545 |
| DMP_Function_End( ) - | inserted at the end of each function included in code 545 |
| DMP_Load( ) - | inserted prior to each load block |
| DMP_Store( ) - | inserted prior to each store block |
| DMP_Commit( ) - | inserted prior to any jump block; inserted prior to any function call; inserted prior to any OS call; inserted prior to a return block |
| DMP_Init( ) - | inserted at each jump-to block from another block containing a DMP_Commit( ); inserted after each function call; inserted after each OS call; inserted after DMP_Function_Start( ); |

Figure 11:
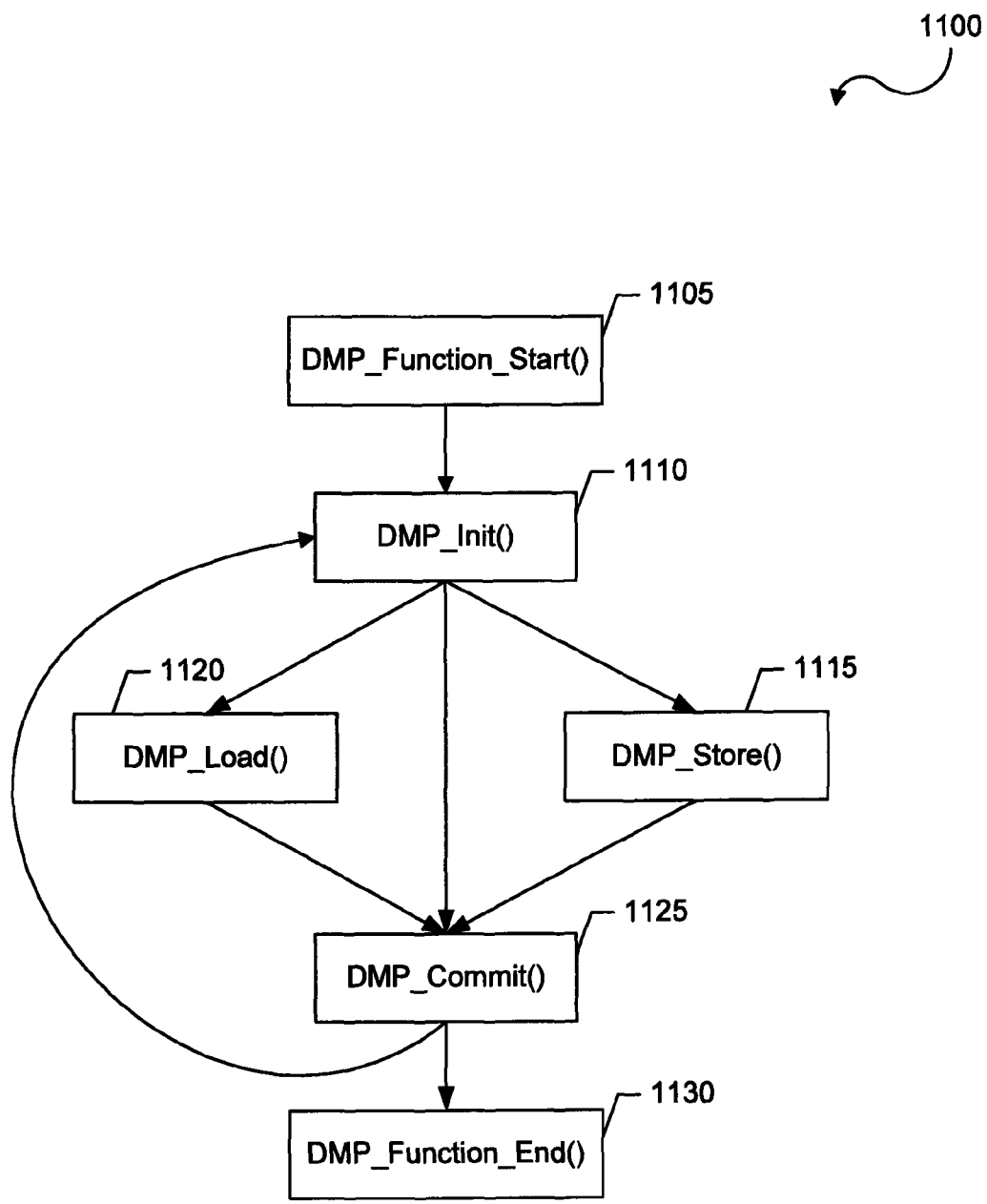
FIG. 11 is an example of a control flow graph of an augmented function of a multithread application in one or more embodiments.

In some embodiments, the quantum builder component 505 creates an intermediate representation of the augmented code, which may be represented, for example, as a control flow graph ("CFG"). FIG. 11 illustrates an example of a control flow graph of a function of multithreaded application code 545 augmented according Table 2. In some embodiments, after the multithreaded application code 545 is augmented, a compiler re-optimizes the augmented code, for example, by inlining calls to the DMP function 515-540. Those skilled in the art will appreciate that the compiler may perform other optimizations to the augmented code not specifically described herein.

In some embodiments, the multithreaded application code 545 uses a transactional memory system, such as an STM, HTM, or HS-TM, to control access by threads to shared resources. In such embodiments, the deterministic multiprocessing layer 500 may be used to control the order in which transactions are committed by threads of the multithreaded application. For example, the quantum builder 505 may wrap each quantum in a transaction by inserting a call to a DMP initialization function 520 and a DMP commit function 535. As another example, when the multithreaded application code 545 includes one or more application-level transactional memory blocks, the quantum builder component 505 may augment the multithreaded application code 545 by inserting a call to a DMP initialization function 520 prior to each atomic block declared by a software developer, and by inserting a call to a DMP commit function 535 prior to any call to the TM system to commit an instruction. As yet another example, the deterministic multiprocessing layer 500 may augment an interface provided by the TM system by wrapping calls to functions of the TM interface with calls to one or more functions 515-540 of the DMP component 510. As a result, when the deterministic multiprocessing layer 500 operates together with a TM system, transactions may be started and/or committed deterministically. It is noted that when the transactional memory system is a HTM system, the DMP load function 530 and DMP store function 525 do not need to be included, as long as the HTM performs such tracking.

In some embodiments, the multithreaded application code 545 is compiled into an executable augmented application 550. While in other embodiments, the augmented application 550 is a machine independent, intermediate language code, which is converted into executable instructions at runtime. Following augmentation, the augmented application 550 may be deterministically executed on a multiprocessing system. That is, given the same input to the augmented application 550, a multiprocessing system will interleave thread quantum deterministically, thereby producing the same output each time the augmented application 550 is executed. Those skilled in the art will appreciate that the components shown in FIG. 5 may be altered in a variety of ways. For example, certain components may be merged or divided; certain components may be omitted; certain components may be added, such as, for example, a compiler; and so on.

In some embodiments, the functions 515-540 provided by the DMP component 510 are responsible for passing or advancing a token deterministically between the threads of the augmented application, thereby deterministically controlling the forward progress of each thread. In some embodiments, this is accomplished by using a thread data structure 600. FIG. 6 is a high-level block diagram showing a thread data structure 600 used by the facility to make multiprocessor code deterministic in one or more embodiments. In some embodiments, the thread data structure 600 includes a thread container 605. The thread container stores a thread ID for each thread that is created by the augmented application during execution. The thread container 605 may be implemented as an array, a linked list, a queue or other data structure of thread IDs.

In some embodiments, the thread data structure 600 includes a token 610 that is used to control the ordering of execution of transaction or controlled operations by threads of the augmented application during execution. For example, in some embodiments, prior to executing a controlled operation or committing a transaction, a thread determines whether its thread ID matches the current value of the token 610. When the current value of the token 610 matches a thread's ID, a corresponding thread may execute the controlled operation or attempt to commit the transaction. Otherwise, the corresponding thread waits until the current value of the token 610 matches its thread ID.

In some embodiments, the order in which threads are created corresponds to the order in which the threads are deterministically executed. For example, as each thread is created, the thread's corresponding thread ID may be sequentially stored in the thread container 605. As transactions or controlled operations are executed, the executing thread invokes certain DMP functions, such as DMP_Commit( ) 535, which operate to advance the value of the token 610 by sequentially looping through the thread IDs stored in the thread container 605 based on the sequence in which the thread IDs were stored (beginning with the first thread ID). It is noted that, when a thread exits, the thread's corresponding ID is removed from the thread container 605.

In some embodiments, the thread data structure stores a commit block size 615. The commit block size 615 represents a predetermined number of transactions or controlled operations that may be executed by a thread whose thread ID matches the current value of the token 610 before the token is advanced. The commit block size 615 may range from 1 transaction or controlled operation to N transactions or controlled operations. In at least one embodiment, the commit block size 615 is equal to one thousand (1,000). In some embodiment, the commit block size 615 is configurable. For example, the commit block size 615 may be configured by a software developer to programmatically manipulate and test the various thread interleaving of an augmented application. As another example, the commit block size 615 may be automatically configured based on the maximum number of threads that may be created by the augmented application and/or the number of processor or cores of the multiprocessing system on which the augmented application executes.

Those skilled in the art will appreciate that a variety of techniques may be used to count the number of controlled operations executed by a thread. In some embodiments, the thread data structure 600 includes a thread commit block 620. The thread commit block 620 may represent the number of controlled operations that have been executed by a thread whose thread ID matches the current token ID 610. Each time the thread performs a controlled operation, the value of the thread commit block 620 is incremented, and the compared to the commit block size 615. If the value of the thread commit block 620 equals the commit block size 615, then the token 605 is advanced to the next thread ID, and the value of the thread commit block 620 is reset to zero. As an alternative example, the thread commit block 620 may represent the number of blocks that remain before a thread attempts to commit its corresponding transaction. In such embodiments, the thread commit block 620 may include a number of remaining blocks for each thread having a thread ID stored in the thread container 605. Then, each time a thread performs a block, the thread decrements its corresponding thread commit block and, when the number of remaining blocks equals zero, the thread attempts to commit its transaction.

In some embodiments, the thread data structure includes a threads-in-use block 625, which represents the number of threads executing in an augmented application. In some embodiments, the threads-in-use block 625 is incremented each time a thread is created. Similarly, the threads-in-use block 625 is decremented each time a thread exits. While in other embodiments, the threads-in-use block 625 is determined based on the size of the thread container 605. Those skilled in the art will appreciate that the thread data structure 600 shown in FIG. 6 may be altered in a variety of ways. For example, certain parts may be merged or divided; certain parts may be omitted; certain parts may be added; and so on.

Figure 7:
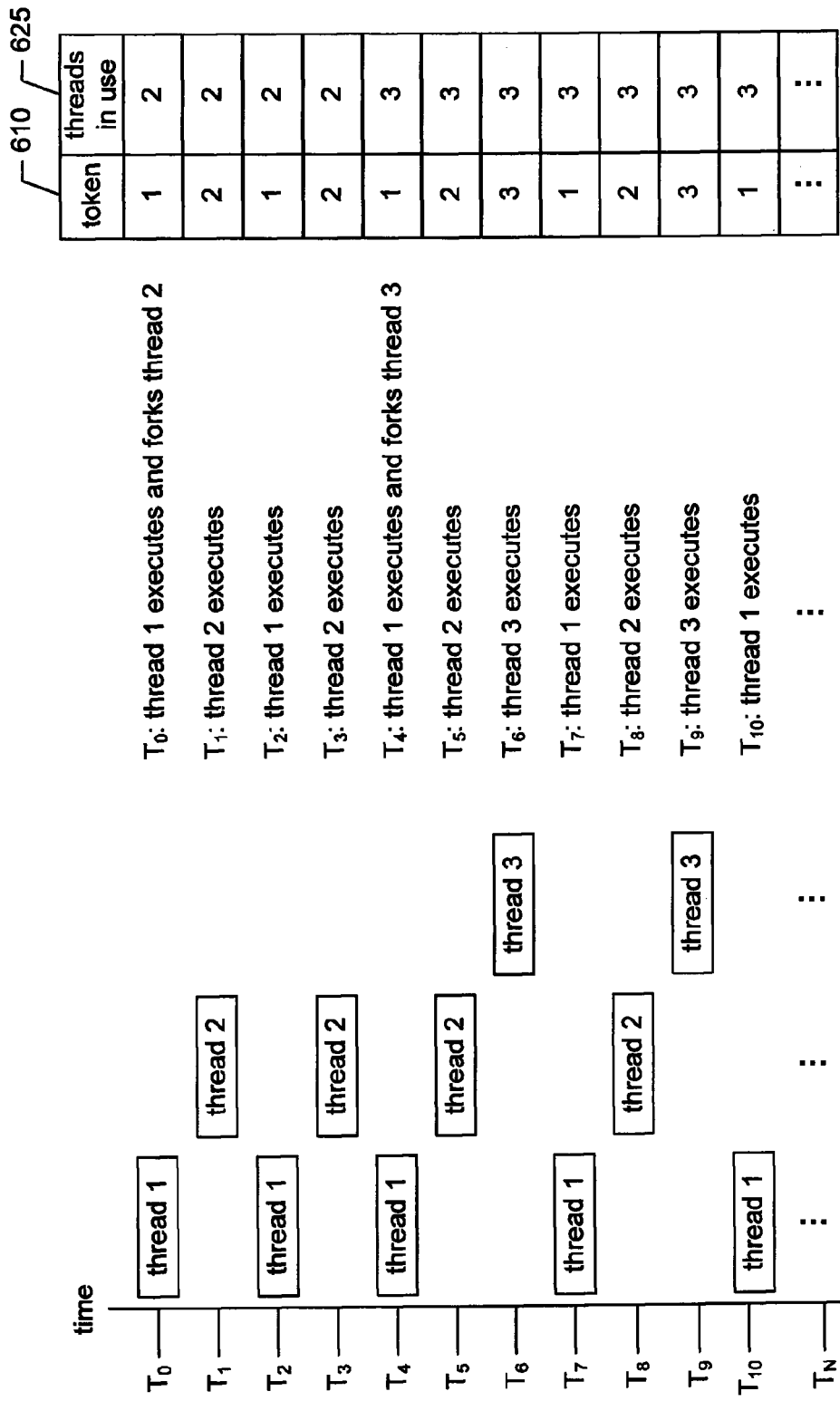
FIG. 7 is a high-level diagram showing an example of creating and deterministically executing threads in one or more embodiments.

FIG. 7 is a high-level diagram showing an example of creating and deterministically executing threads in one or more embodiments. To facilitate description, the contents of a portion of the thread data structure 600 are shown over time. As illustrated by the token value 610, the order in which threads are created corresponds to the order in which the threads are deterministically executed.

In the illustrated example, the first-created thread ("thread 1") represents the main application thread of the multi-threaded application. To facilitate description, the thread ID of each thread is equal to the order in which the thread was created. That is, the thread ID of the first-created thread is 1; the thread ID of the second-created thread is 2; the thread ID of the third-created thread is 3; and so on. Between time $T_0$ and $T_1$, thread 1 executes and thread 2 is created. In the illustrated example, a thread's execution is represented by a specified number of controlled operations (e.g., a quantum specified by commit block size 615). Thus, the time increments illustrated in FIG. 7 are not necessarily equal. It is also noted that the number of uncontrolled operations executed by each thread may be different, and may differ for each thread during each of its execution periods.

Returning to FIG. 7, because thread 2 was created at some point before thread 1 completed its quantum execution, the number of thread-in-use 625 between time $T_0$ and $T_1$ is two. As a result, when thread 1 completed, the token 610 was advanced to the next thread ID stored in the thread container 605 (i.e., thread 2).

Between time $T_1$ and $T_2$, thread 2 executes, and then the token 610 is advanced back to thread 1. Between time $T_2$ and $T_3$, thread 1 executes, and then the token 610 is advanced to thread 2. Between time $T_3$ and $T_4$, thread 2 executes, and then the token 610 is advanced back to thread 1.

Between time $T_4$ and $T_5$, thread 1 executes and thread 2 is created. Although thread 3 was created between time $T_4$ and $T_5$, thread 2 executes between time $T_5$ and $T_6$. This is because the order in which threads were created corresponds to the order in which the threads are executed. As a result, thread 2 executes between time $T_5$ and $T_6$, and then the token 610 is advanced to thread 3. Thread 3 then executes between time $T_6$ and $T_7$, and then the token 610 is advanced back to thread 1.

Figure 8:
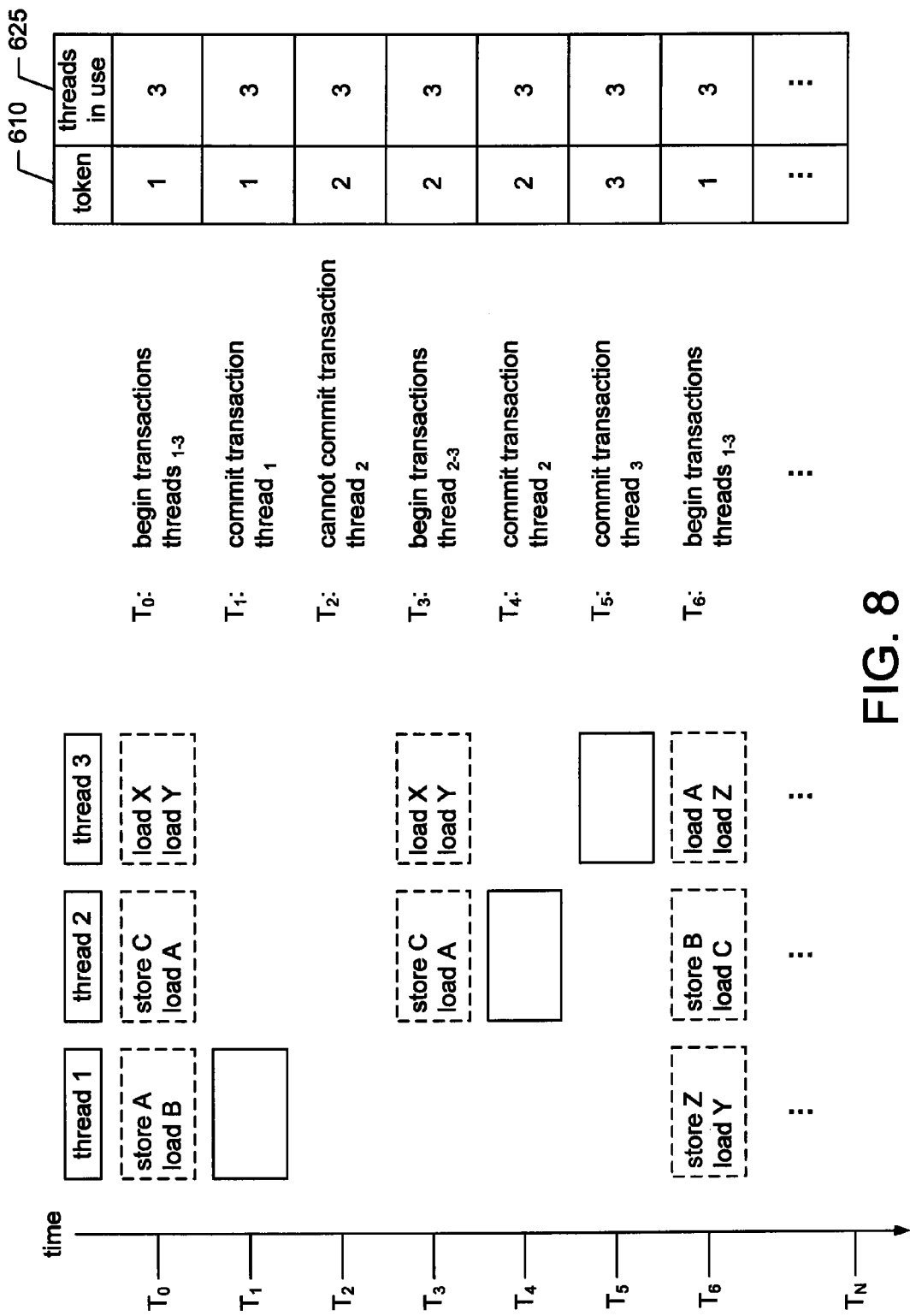
FIG. 8 is a high-level diagram showing an example of utilizing a transactional memory system to make multiprocessor code deterministic in one or more embodiments.

FIG. 8 is a high-level diagram showing an example of utilizing a transactional memory system to make multiprocessor code deterministic in one or more embodiments. To facilitate description, the contents of a portion of the thread data structure 600 are shown over time. Also, to facilitate description, it is assumed that the thread IDs are ordered in the thread container 605 as follows: thread 1, thread 2, thread 3. As illustrated by the token value 610 over time, the order in which threads commit transactions is deterministic. To facilitate description, the first value of the token 610 corresponds to the thread ID of thread 1. In the illustrated example, the transactions executed by each thread are deterministic in size. That is, each thread executes a specific number of blocks. To facilitate description, the commit block size 615 is two.

As illustrated, at time $T_0$, threads 1-3 begin a transaction. After a thread completes its corresponding transaction, the thread attempts to deterministically commit its transaction. In some embodiments, each thread determines whether its transaction resulted in a conflict that would prevent the thread from committing its transaction. While in other embodiment, this determination is made by a thread when its thread ID matches the current value of the token 610. For example, this may be accomplished by calling STMValidTransaction( ).

At time $T_1$, the current value of token 610 matches the ID of thread 1. Thus, in the illustrated example, thread 1 determines whether its transaction resulted in a conflict that would prevent it from committing the transaction. Although thread 1 and thread 2 accessed the same shared memory location (i.e., address A), the transaction of thread 1 is valid. This is because thread 1 stored a value at address A and the token 610 matched its thread ID. That is, the store of A (performed by thread 1) is not affected by the load of A (performed by thread 2). As a result, thread 1 commits its transaction (e.g., by calling STM-CommitTransaction( )), and then the token 610 is advanced to the next thread ID. However, if the token 610 had matched the thread ID of thread 2, then thread 1 would abort its transaction. This is because thread 2 may have loaded A after thread 1 stored A. Assuming that the token 610 matched the ID of thread 2, then both thread 1 and thread 2 would abort their transactions. In which case, thread 2 would begin and commit the aborted transaction prior to restarting the aborted transaction of thread 1.

As illustrated, at time $T_1$, thread 1 commits it transaction, and then the token 610 is advanced to thread 2. However, thread 2 cannot commit its transaction because thread 2 loaded a value that was stored by thread 1 during the same transaction. That is, thread 2 may have loaded A prior to thread 1 storing A. As a result, thread 2 must abort its transaction and restart. In the illustrated example, all threads having thread IDs subsequent to an aborted thread are aborted. While in other embodiments only those threads having subsequent IDs whose concurrent transactions accessed the same shared resource are aborted and restarted. Thus, in the illustrated example, the transaction of thread 3 is aborted and restarted. However, in other embodiments, the transaction of thread 3 would not be aborted because its transaction did not access a shared resource that was accessed by thread 2 or thread 1 during the concurrent transaction. Instead, thread 3 would simply wait for the token 610 to match its thread ID. It is noted that the token 610 is not advanced until the thread whose thread ID matches the token successfully commits its corresponding transaction.

As illustrated, at time $T_3$, threads 2-3 restart their aborted transactions. At time $T_4$, the current value of token 610 matches the ID of thread 2, so thread 2 determines whether its restarted transaction resulted in a conflict that would prevent it from committing the transaction. In the illustrated example, the restarted transactions of threads 2 and 3 do not access any shared memory locations. As a result, at time $T_4$, thread 2 successfully commits it transaction, and then the token 610 is advanced to thread 3. At time $T_5$, thread 3 successfully commits its transaction, and then the token 610 is advanced back to thread 1.

Next, at time $T_6$, threads 1-3 begin a transaction, and the process continues as described above. It is noted that, at time $T_6$, the concurrent transactions of threads 1 and 3 will result in thread 3 aborting and restarting its transaction. However, threads 1 and 2 will deterministically commit, and the token 610 will be advanced to thread 3, as described above.

Figure 9:
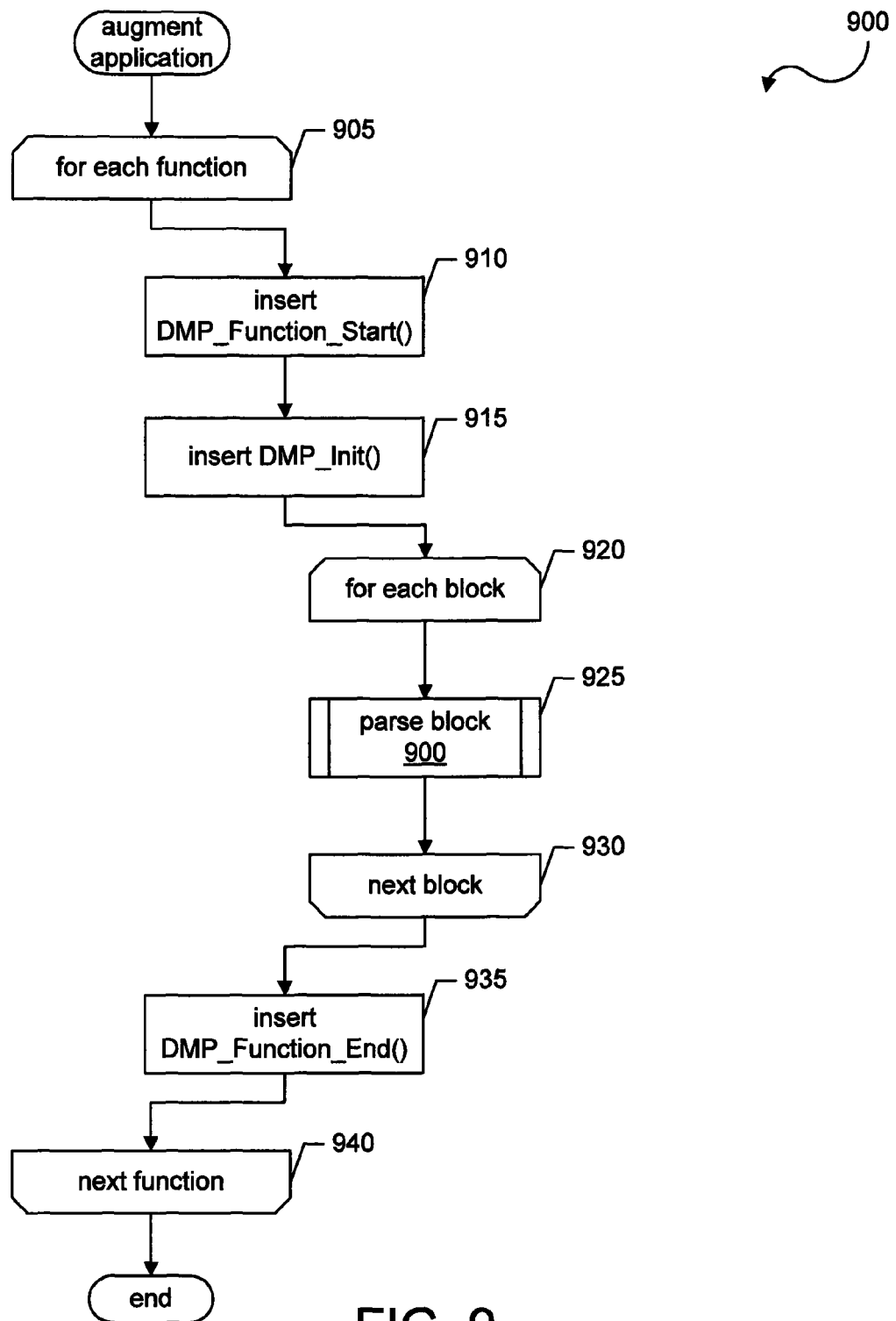
FIG. 9 is a flow diagram showing a process performed by the facility to augment an application in one or more embodiments.

FIG. 9 is a flow diagram showing a process 900 performed by the facility to augment multithreaded application code in one or more embodiments. In steps 905-940, the facility loops through each function of the multithreaded application code 545. In step 905, the facility selects a function, and then the facility continues to step 910. In step 910, the facility inserts a deterministic multiprocessing start-up function, such as DMP_Function_Start( ) function 515, and then the facility continues to step 915. At step 915 the facility inserts a deterministic multiprocessing initialization function, such as DMP_Init( ) function 520, and then the facility continues to step 920. In steps 920-930, the facility loops through each block of the selected application. In step 920, the facility selects a block, and then the facility continues to step 925. In step 925, the facility calls a parse block function 1000, and then the facility continues to step 930. In step 930, if additional blocks remain, then the facility continues to step 920, else the facility continues to step 935. In step 935, the facility inserts a deterministic processing end function, such as DMP_ Function_End( ) 540, and then the facility continues to step 940. In step 940, if additional functions remain, the facility continues to step 905, else these steps end.

Figure 10:
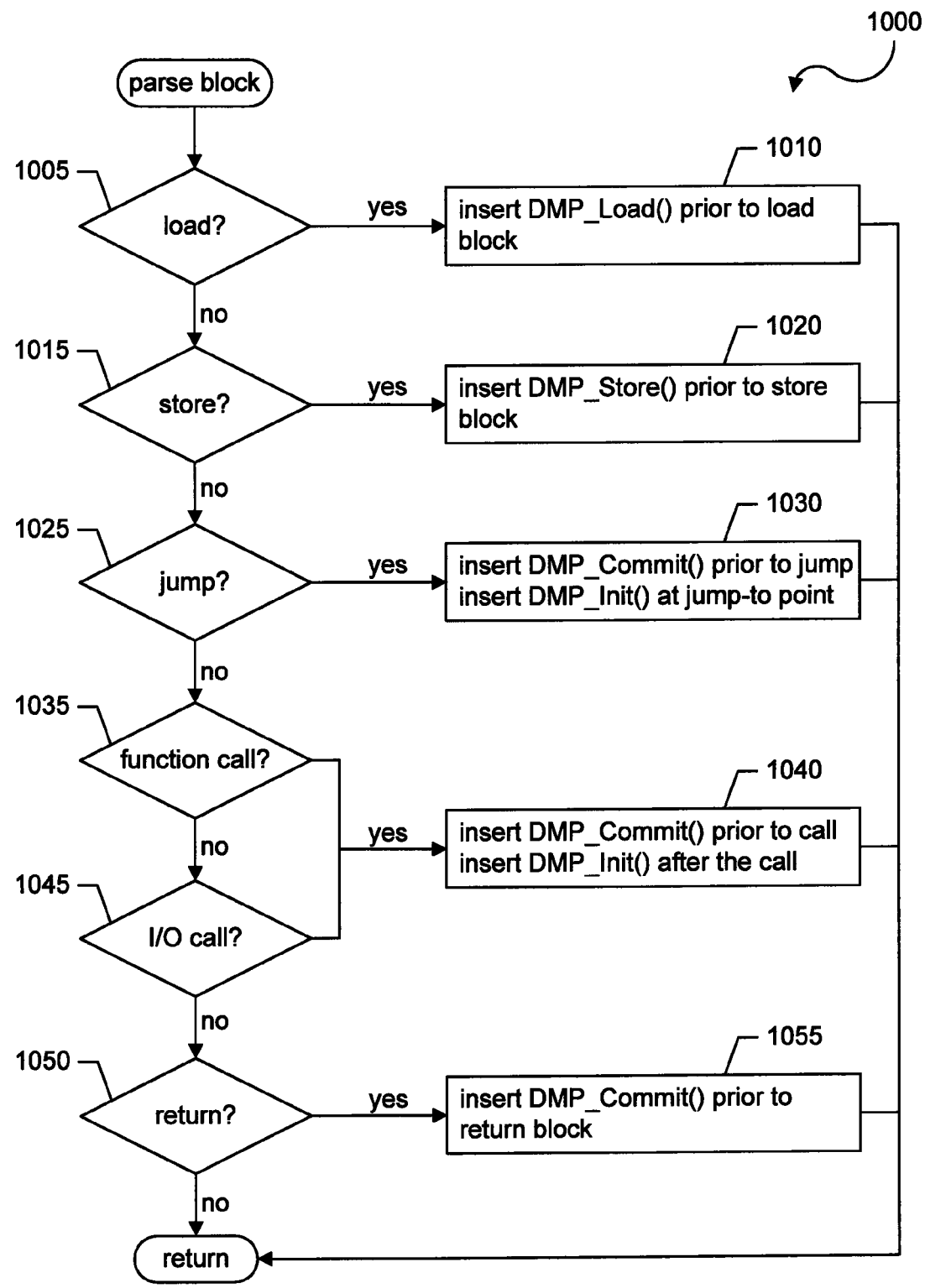
FIG. 10 is a flow diagram showing a process performed by the facility to parse a block in one or more embodiments.

FIG. 10 is a flow diagram showing a process 1000 performed by the facility to parse a block in one or more embodiments. In step 1005, if the facility determines that the block is a load block, then the facility continues to step 1010, else the facility continue to step 1015. In step 1010, the facility inserts a call to DMP_Load( ) function 530 prior to the load block, then the facility returns. In step 1015, if the facility determines that the block is a store block, then the facility continues to step 1020, else the facility continues to step 1025. In step 1020, the facility inserts a call to DMP_Store( ) function 525 prior to the store block, then the facility returns. In step 1025, if the facility determines that the block is a jump block, then the facility continues to step 1030, else the facility continues to step 1035. In step 1030, the facility inserts a call to DMP_Commit( ) function 535 prior to the jump and inserts a call to DMP_Init( ) function 520 at the jump-to point, then the facility returns. In step 1035, if the facility determines that the block is a function call, then the facility continues to step 1040, else the facility continues to step 1045. In step 1040, the facility inserts a call to DMP_Commit( ) function 535 prior to the call and inserts a call to DMP_Init( ) 520 after the call, then the facility returns. In step 1045, if the facility determines that the block is an I/O call, then the facility continues to step 1040 as described above, else the facility continues to step 1050. In step 1050, if the facility determines that the block is a return block, then the facility continue to step 1055, else the facility returns. In step 1055, the facility inserts a call to DMP_Commit( ) 535 prior to the return block, then the facility returns.

FIG. 11 is an example of a control flow graph 1100 of an augmented function of a multithread application in one or more embodiments. The term "control flow graph" refers to a representation of all paths that might be traversed through an application during its execution. Each node 1105-1130 in the graph 1100 represents a basic block, i.e. a straight-line piece of code without any jumps or jump targets. Jump targets start a block, and jumps end a block. For example, block 1110, which represents the DMP_Init( ) function 520 is a jump target. Block 1105 represents the entry block, through which all control enters into the flow graph. Block 1130 represents the exit block, through which all control flow leaves. Directed edges, such as, for example, the edge between block 1115 and 1125, the edge between 1120 and 1125, and the edges between block 1110 and blocks 1115, 1120, and 1125 are used to represent jumps in the control flow.

Figure 12:
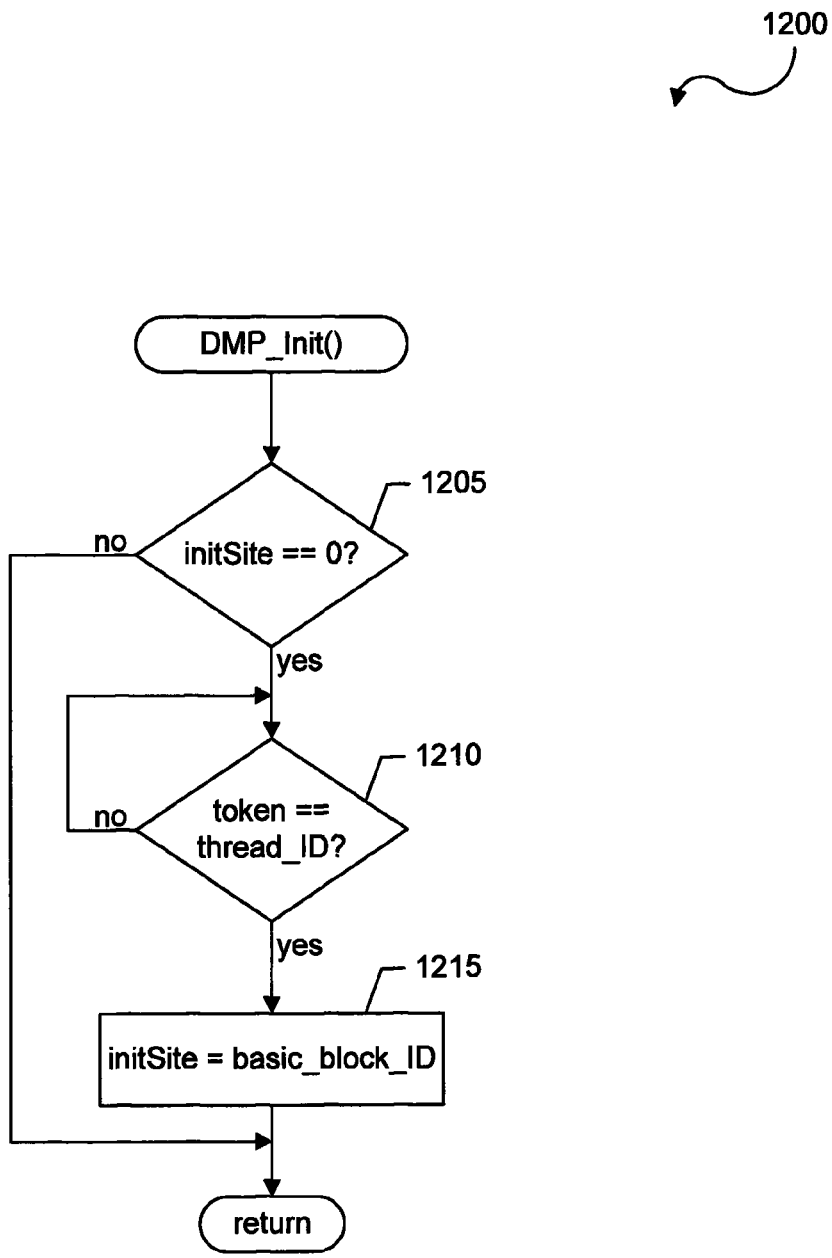
FIG. 12 is a flow diagram showing a deterministic multiprocessing initialization function in one or more embodiments.

FIG. 12 is a flow diagram showing a deterministic multiprocessing ("DMP") initialization function 1200 in one or more embodiments. For example, the DMP initialization function 1200 may be performed when the facility operates together with a transactional memory system. The DMP initialization function may be performed to determine whether a thread is in an initialized state, such that the thread may begin or continue processing a transaction. If a thread is not initialized (i.e., the value of the thread's initSite variable equals zero), its execution is suspended until the value of the token matches the thread's ID. If a thread is initialized, the thread continues executing.

In step 1205, if the facility determines that the value of a thread's initiation variable ("initSite") is equal to zero, then the facility continues to step 1210, else the facility returns. A thread's initialization variable may be assigned to zero, for example, after a thread successfully commits a transaction. In step 1210, if the facility determines that the current value of the token matches the thread's ID, then the facility continues to step 1215, else the facility loops back to step 1210. That is, the facility suspends the thread execution in step 1210 until the thread's ID matches the value of the token. In step 1215, the facility assigns the initSite variable to the memory address at which the thread begins a transaction, then the facility returns. The initSite variable may then be used as an explicit jump address if the transaction cannot be committed.

Figure 13:
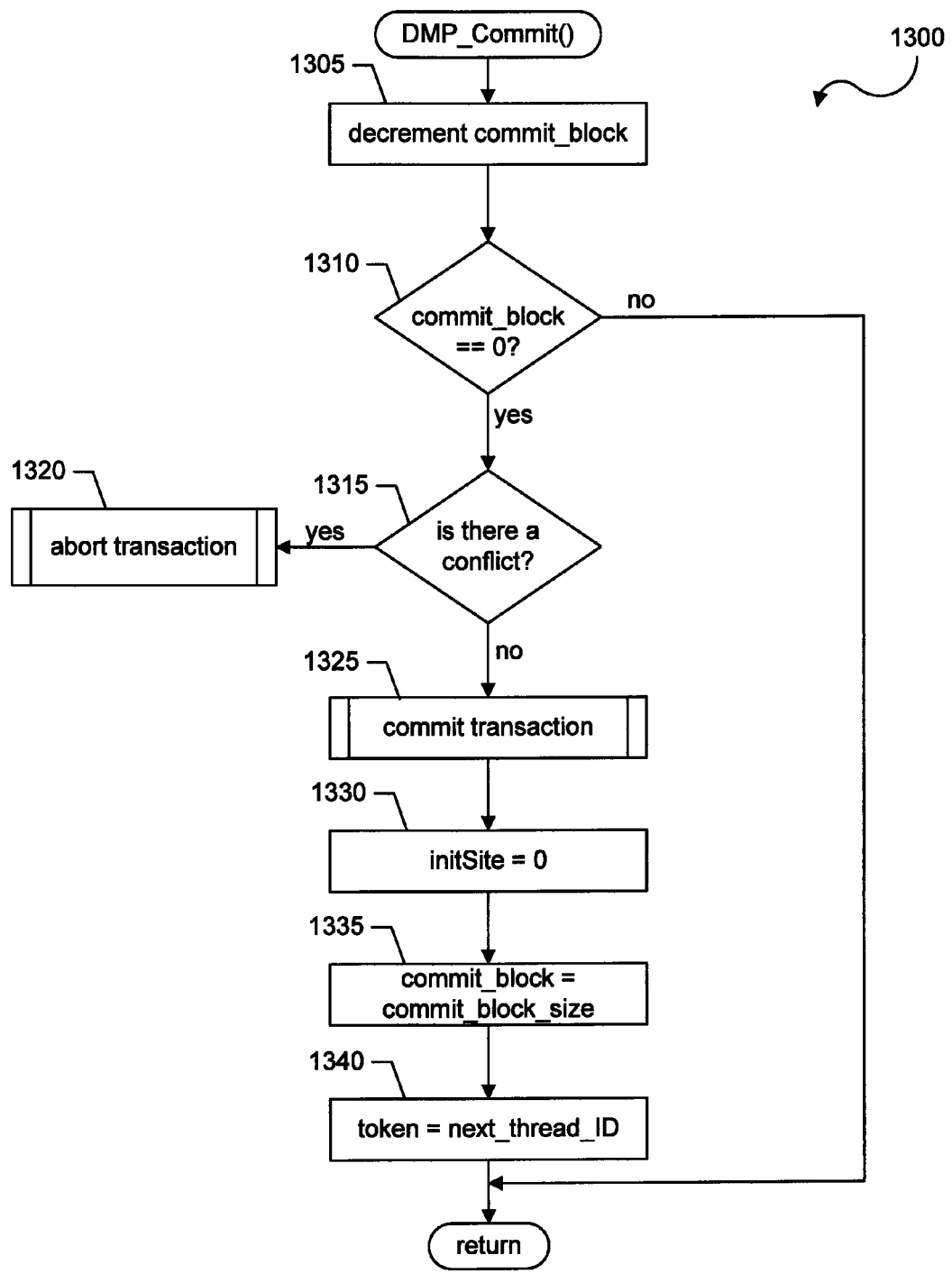
FIG. 13 is a flow diagram showing a deterministic multiprocessing commit function in one or more embodiments.

FIG. 13 is a flow diagram showing a deterministic multiprocessing ("DMP") commit function 1300 in one or more embodiments. For example, the DMP commit function 1300 may be performed when the facility operates together with a transactional memory system. In step 1305, the facility decrements the value of the commit block variable, then the facility continue to step 1310. The commit block variable is used to count the number of operations performed by a thread. In step 1310, if the facility determines that the value of the commit block variable is zero, then the facility continues to step 1315, else the facility returns. In step 1315, if the facility determines that there was a conflict between (for example, because the thread read from a location written by another thread during the transaction), then the facility continues to step 1320, else the facility continues to step 1325. In step 1320, the facility aborts the transaction. In step 1325, facility commits the transaction, then the facility continues to step 1330. In step 1330, the facility assigns the value of the thread's initSite variable to zero, then the facility continues to step 1335. In step 1335, the facility resets the value of the commit block variable of the thread by assigning the value of the commit block variable to the commit block size, then the facility continues to step 1340. In step 1340, the facility advances the token by assigning the value of the token to the value of the next thread ID, then the facility returns.

Figure 14:
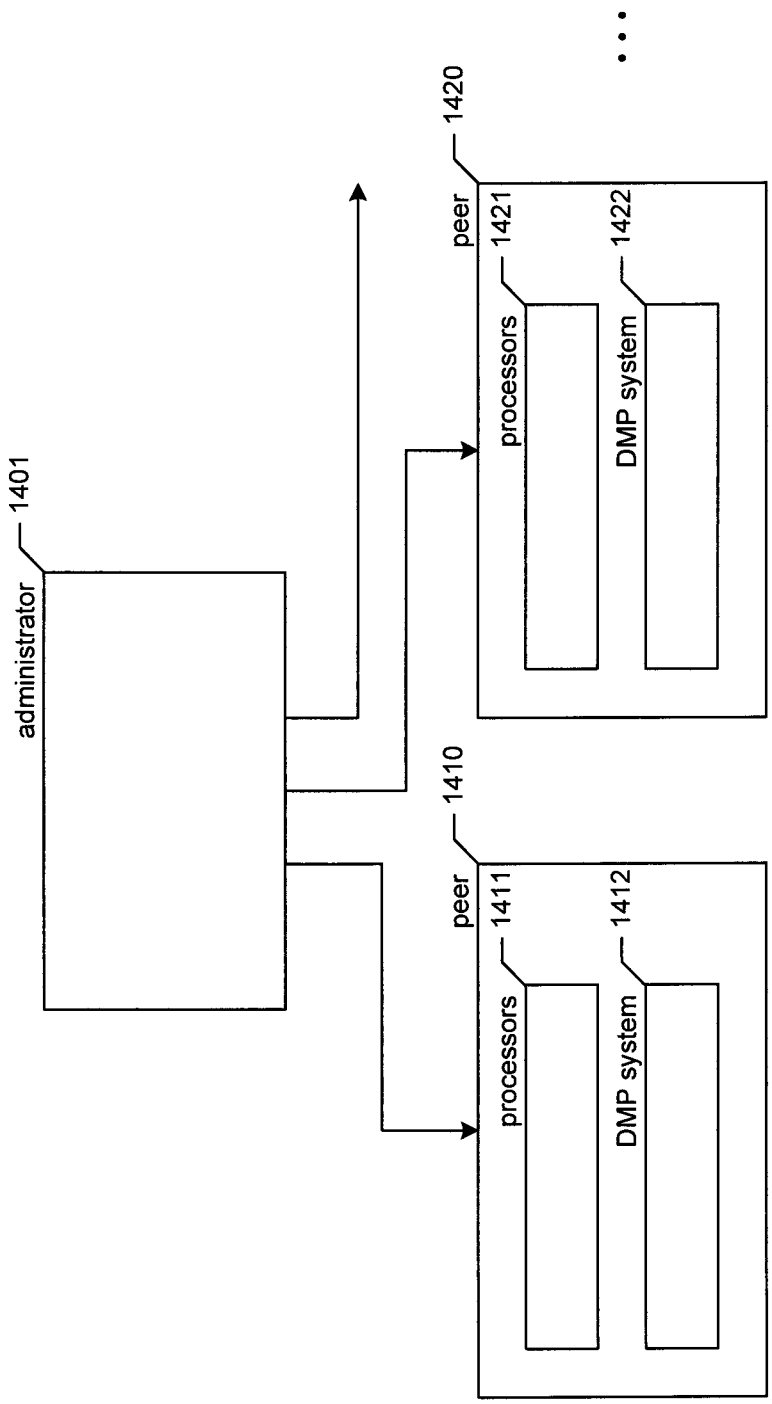
FIG. 14 is a network diagram showing a typical network environment in which the facility performs deterministic multiprocessing-based synchronized replication.

In some embodiments, the facility uses deterministic multiprocessing to synchronize the execution of a multi-threaded program on two or more separate peer machines. FIG. 14 is a network diagram showing a typical network environment in which the facility performs deterministic multiprocessing-based synchronized replication. The drawing shows an administrator system 1401 that manages the synchronized deterministic execution of a multi-threaded program on each of a number of peer machines 1410, 1420, etc. Each of the peer machines has multiple processors 1411, and/or one or more processors with separate multiple processing elements, such as multiple separate cores. Each of the peer machines further contains a deterministic multiprocessing system 1412 that causes the peer machine to execute the multi-threaded program deterministically, in a way that is consistent with how the program is executed by the other peer machines. In some embodiments, instead of the administrator being resident on a machine other than the peer machines, the administrator is resident on one of the peer machines.

In various embodiments, the administrator: initiates execution of the multi-threaded program on each of the peer machines; directs program input to the appropriate peer machine or machines; collects state from the peer machines, including states such as contents of a deterministic multiprocessing journal showing processing of the program by each thread, in some cases down to the machine instruction level, and/or a transaction journal showing the processing by the peer machine of transactions or other input; retrieves output from the program running on the peer machines; analyzes state and/or output from a machine to evaluate the machine's performance; based on the evaluation of peer machines, identifies peer machines that are not performing appropriately and takes responsive action, such as disabling the machine, redirecting input and/or processing load that would have been undertaken by the disabled peer machine to a different peer machine; replaces the peer machine with a different peer machine onto which is replicated either the state of the underperforming peer machine or the state of another peer machine that is not performing inappropriately; adds new peer machines, such as in response to increased processing load, whose state is replicated from one or more of the existing peer machines, etc.

In some embodiments, because each of the peer machines execute the program deterministically, no information needs to be collected from any of the peer machines about interleavings pursued by the peer machines in order to successfully coordinate execution of the program by the peer machines.

Figure 15:
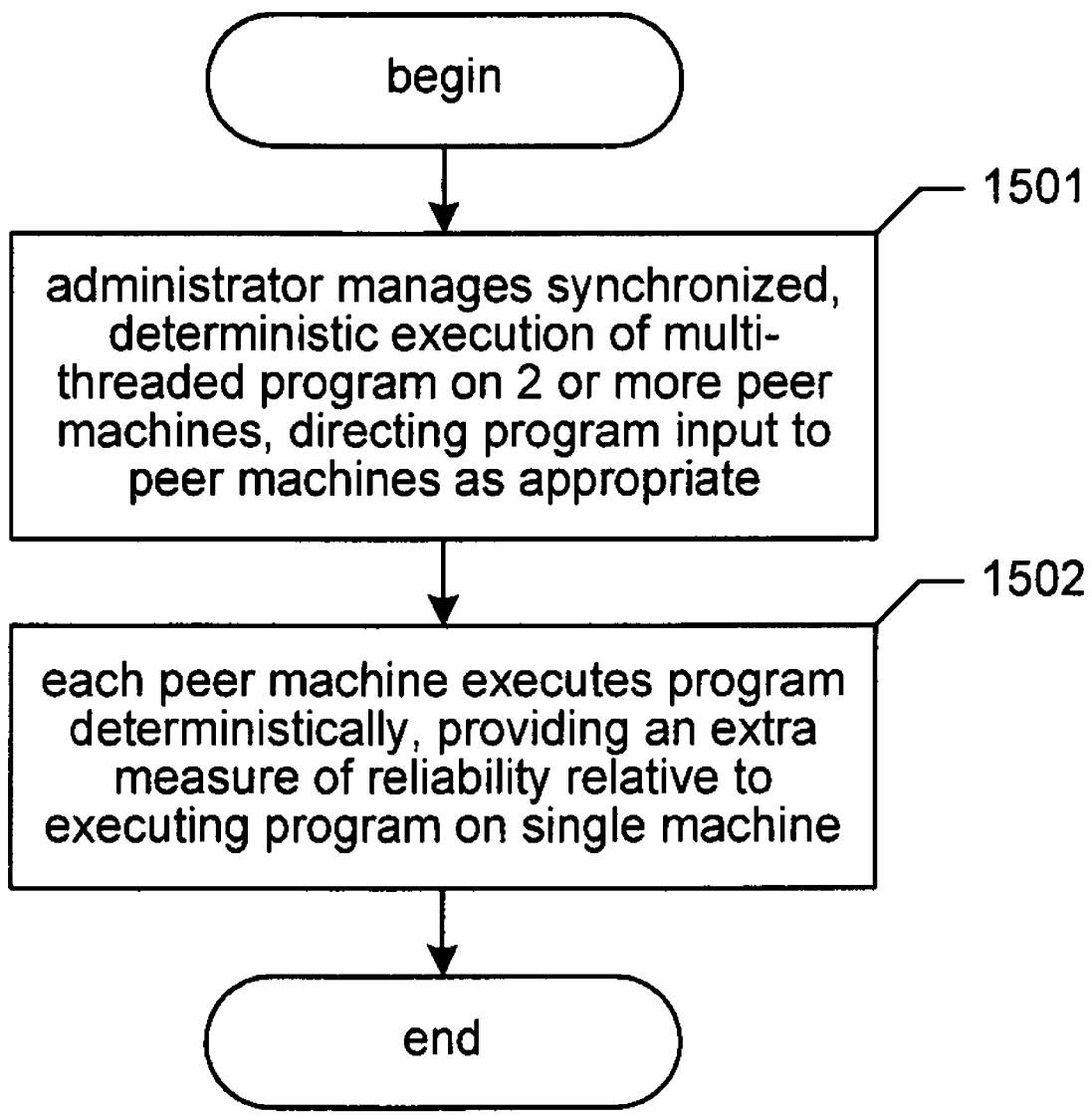
FIG. 15 is a flow diagram showing steps typically performed by the facility as part of deterministic multiprocessing-based synchronized replication.

FIG. 15 is a flow diagram showing steps typically performed by the facility as part of deterministic multiprocessing-based synchronized replication. In step 1501, the administrator manages the synchronized, deterministic execution of a multi-threaded program on two or more peer machines, directing program input to the peer machines as appropriate. In some embodiments, the administrator executes in one of the peer machines; in some embodiments, the administrator executes in a machine other than the peer machines. In step 1502, each peer machine executes the program deterministically, providing an extra measure of reliability relative to executing the same program on a single machine.

In some embodiments, the administrator initiates execution of the program in two or more of the peer machines simultaneously. In some embodiments, after a peer machine has been executing the program for a period of time, the administrator replicates the state of that peer machine to a peer machine not presently in use, then executes the program on the new peer machine in synchronization with the replicated machine. In various embodiments, this replication involves, as examples, copying the entire state of the replicated peer machine; copying a proper subset of the state of the replicated machine that is expected to cause the execution of the program on a new peer machine to be synchronized with its execution on the replicated machine; or by pausing the replicated peer machine, copying the deterministic multiprocessing journal from the replicated peer machine to the new peer machine, executing the new machine in accordance with the copied journal, then unpausing both peer machines simultaneously.

In some embodiments, the facility maintains the synchronization of peer machines in various ways. In some embodiments, the facility maintains lockstep execution of the program across peer machines by monitoring the state of each of the peer machines in the administrator and pausing or otherwise adjusting the behavior of peer machines whose state becomes unsynchronized with those of the other peer machines. In some embodiments, the facility establishes reconciliation points in the program, at which each of the peer machines pauses until all of the peer machines have reached the reconciliation point, at which point all of the peer machines resume. In some embodiments, the facility compares in the administrator the deterministic multiprocessing journals of the peer machines and uses the journals to roll forward or backward in one or more of the peer machines in order to reestablish synchronization.

In some embodiments, all of the peers receive all of the same program inputs. For example, where the program is a database engine, all of the peers may receive all of the database transactions to be processed by the database engine. In some embodiments, the input to be processed by the program is divided, such that all of the peers receive completely distinct sets of inputs. For example, where the program is a database engine, each peer may receive a distinct subset of the database transactions to be processed by the database engine. In various embodiments, the administrator distributes to the program across the peers in various other ways.

In various embodiments, the facility identifies a problem with one of the peer machines in a variety of ways. In some embodiments, the facility detects a program based upon an overt failure of the peer machine, such as a power failure, a failure to respond to network traffic, a failure to provide periodic updates, or a crash, exception, or interrupt. In some embodiments, the facility identifies a problem with a peer machine by analyzing its state or output, either in isolation or in comparison to the state and/or output of other peer machines. In some embodiments, the facility performs a fail-stop, in which the execution of the program in all of the peers is stopped.

In various embodiments, the facility takes various action with respect to a peer machine for which a problem has been identified. In some embodiments, the facility disables the peer machine having an identified problem, permitting the other peer machines to proceed without any adjustment. In some embodiments, the facility replaces the disabled peer machine, either by replicating one of the other peer machines onto the disabled peer machine or replicating one of the other peer machines onto a new peer machine. In some embodiments, the facility adjusts the state of the peer machine for which the problem was identified, such as by rolling it forward or backward, either with respect to its own deterministic multiprocessing journal and/or transaction journal or with respect to the journal or journals of another peer machine. In some embodiments, the facility causes a peer machine other than the peer machine in which the problem is identified to generate a replay package in accordance with U.S. Provisional Patent Application No. 61/313,691 filed on Mar. 12, 2010, which is hereby incorporated by reference herein in its entirety. As one example, the facility causes the replay package to be generated by a peer machine whose execution of the program trails the execution of the program by the peer machine in which the problem is identified. This trailing execution may have been caused by the facility, or merely observed by the facility. In some embodiments, instead of or in addition to causing another peer machine to generate a replay package, the facility causes the other machine to pause its execution of the program at a point before the point at which the machine in whose execution of the multithreaded program the problem was detected encountered the problem, so that the paused peer machine can be unpaused at a future time to exhibit the problem. In some embodiments, the facility identifies an interleaving or other path of execution pursued in the program by the machine in whose execution of the multithreaded program the problem was detected. The facility causes one or more of the peer machines to pursue a path of execution other than the identified path of execution in an attempt to avoid the problem encountered by the machine in whose execution of the multithreaded program the problem was detected. In some embodiments, at a point after which the peer machine has avoided the detected problem, the facility replicates the state of the peer machine to the machine in whose execution of the multithreaded program the problem was detected.

In some embodiments, the facility adapts to the current load level of the program, initiating or disabling peer machines in order to modify the total processing capacity represented across the peer machines executing the program. In some embodiments, the facility adds or subtracts peer machines based upon a variety of other factors, such as the perceived current likelihood of program failure, the perceived level of need to avoid program failure across the peer machines in use, etc.

By performing some or all of these ways, the facility provides an extra measure of reliability in executing the program relative to executing the program on a single machine.

In various embodiments, the facility interacts with multi-threaded programs of different forms, including an autonomous, explicit multithreaded program; a concurrent task-based program; a single threaded program running on top of a runtime and/or an operating system that each have one or more of their own threads; or a runtime or an operating system that has two or more of its own threads.

Although the facility has been described with reference to specific embodiments, it will be recognized that the facility is not limited to the embodiments described, but can be practiced with modification and alteration within the spirit and scope of the appended claims. Accordingly, the specification and drawings are to be regarded in an illustrative sense rather than a restrictive sense.

We claim:

1. A method in a computing system for executing a multithreaded program, comprising:

for each of a plurality of machines, causing the machine to execute the multithreaded program deterministically, the deterministic execution comprising receiving one or more inputs, such that the deterministic execution of the multithreaded program is replicated across the plurality of machines;

detecting a problem in the execution of the multithreaded program by one of the plurality of machines; and in response to the detecting, disabling the operation of the machine in whose execution of the multithreaded program the problem was detected, wherein the disabling comprises preventing the receipt of further inputs by the machine in whose execution of the multithreaded program the problem was detected.

2. The method of claim 1 wherein each of the plurality of machines is a physical machine.

3. The method of claim 1, wherein the disabling further comprises causing to be delivered to at least one of the plurality of machines other than the machine in whose execution of the multithreaded program the problem was detected inputs that would have been delivered to the machine in whose execution of the multithreaded program the problem was detected if the problem had not been detected.

4. The method of claim 1, further comprising causing outputs from the multithreaded program to be delivered from each of the plurality of machines to one or more output consumers, and wherein the disabling further comprises interrupting the delivery of outputs from the machine in whose execution of the multithreaded program the problem was detected to the output consumers.

5. The method of claim 1 wherein the disabling further comprises interrupting execution of the multithreaded program on the machine in whose execution of the multithreaded program the problem was detected.

6. The method of claim 1, further comprising, after disabling the operation of the machine in whose execution of the multithreaded program the problem was detected:

replicating in the disabled machine the state of one of the plurality of machines other than the disabled machine; and re-enabling the operation of the disabled machine.

7. The method of claim 1 wherein the execution of the program on each of the plurality of machines produces output, the method further comprising comparing the output produced by the machines of the plurality, and wherein detecting a problem in the execution of the multithreaded program by one of the plurality of machines comprises identifying one of the plurality of machines whose output diverges from the output of at least one of the plurality of machines other than the machine in whose execution of the multithreaded program the problem was detected.

8. The method of claim 1 wherein the deterministic execution of the multithreaded program by each of the plurality of machines produces a journal detailing execution of the multithreaded program by the machine, the method further comprising comparing at least a portion of the journal produced by each of the machines of the plurality, and wherein detecting a problem in the execution of the multithreaded program by one of the plurality of machines comprises identifying one of the plurality of machines whose journal contents diverge from the journal contents of at least one of the plurality of machines other than the machine in whose execution of the multithreaded program the problem was detected.

9. The method of claim 1 wherein detecting a problem in the execution of the multithreaded program by one of the plurality of machines comprises determining that execution of the multithreaded program on one of the plurality of machines has failed.

10. The method of claim 1, further comprising:

determining among the plurality of machines their relative progress in executing the multithreaded program;

identifying a difference of at least a threshold magnitude between the progress of a pair of machines among the plurality in executing the multithreaded program; and for each of at least one of the machines of the pair, adjusting the machine's execution of the multithreaded program in a manner likely to reduce the identified difference.

11. The method of claim 10 wherein the identifying comprises determining that the machines of the pair reached a checkpoint within the multithreaded program at times separated by a period whose length is greater than a threshold length.

12. The method of claim 10 wherein the identifying comprises determining that the machines of the pair had, at approximately the same time, program counter values for at least one thread that are separated by a number of instructions that exceeds a threshold number of instructions.

13. The method of claim 10 wherein the adjusting comprises suspending the execution of the multithreaded program by at least one machine of the pair.

14. The method of claim 10 wherein the adjusting comprises rolling back the execution of the multithreaded program by at least one machine of the pair.

15. The method of claim 10 wherein the adjusting comprises rolling forward the execution of the multithreaded program by at least one machine of the pair.

16. The method of claim 1, further comprising, in response to the detecting, disabling the operation of all of the machines of the plurality.

17. The method of claim 1, further comprising, in response to the detecting, causing a machine of the plurality other than the machine in whose execution of the multithreaded program the problem was detected to generate a replay package.

18. The method of claim 1, further comprising, in response to the detecting, causing a machine of the plurality other than the machine in whose execution of the multithreaded program the problem was detected to pause execution of the multithreaded program.

19. The method of claim 1, further comprising:

identifying a path of execution for the multithreaded program pursued by the machine in whose execution of the multithreaded program the problem was detected; and causing a machine other than the machine in whose execution of the multithreaded program the problem was detected to pursue a path of execution for the multithreaded program other than the identified path of execution.

20. The method of claim 19, further comprising:
after causing a machine other than the machine in whose execution of the multithreaded program the problem was detected to pursue a path of execution for the multithreaded program other than the identified path of execution, replicating in the machine in whose execution of the multithreaded program the problem was detected the state of the machine caused to pursue a path of execution for the multithreaded program other than the identified path of execution.

21. A non-transitory computer-readable medium whose contents are capable of causing a computing system to perform a method for executing a multithreaded program, comprising:
for each of a plurality of machines, causing the machine to execute the multithreaded program deterministically, the deterministic execution comprising receiving one or more inputs, such that the deterministic execution of the multithreaded program produces a journal detailing execution of the multithreaded program by the machine;
for each of the plurality of machines, receiving at least a portion of the contents of the journal produced by the machine;
comparing the received journal contents to identify a difference in the execution of the multithreaded program by a pair of machines among the plurality; and
for each of at least one of the machines of the pair, adjusting the machine's execution of the multithreaded program in a manner likely to reduce the identified difference, wherein the adjusting comprises suspending the receipt of further inputs by the at least one of the machines of the pair.

22. The method of claim 21 wherein the adjusting further comprises suspending the execution of the multithreaded program by at least one machine of the pair.

23. The method of claim 21 wherein the adjusting further comprises rolling back the execution of the multithreaded program by at least one machine of the pair.

24. The method of claim 21 wherein the adjusting further comprises rolling forward the execution of the multithreaded program by at least one machine of the pair.

25. The method of claim 21 wherein the identifying identifies a difference of at least a threshold magnitude between the progress of the pair of machines in executing the multithreaded program.

26. The method of claim 21 wherein the identifying identifies a difference of at least a threshold magnitude between the thread interleavings performed by the pair of machines in executing the multithreaded program.

27. A method in a computing system for executing a multithreaded program, comprising:
for each of a plurality of machines, causing the machine to execute the multithreaded program deterministically, the deterministic execution comprising receiving one or more inputs, such that the deterministic execution of the multithreaded program is synchronized across the plurality of machines;
for each of the machines of the plurality, monitoring the execution of the multithreaded program on the machine;
based on the monitoring, identifying an aspect of the execution of the multithreaded program that differs between a pair of the machines in the plurality;
identifying a machine of the pair for which the identified aspect is disadvantageous; and
disabling the identified machine by preventing the receipt of further inputs by the multithreaded program.

28. The method of claim 27 wherein the identified aspect is an aspect of the machines' output.

29. The method of claim 27 wherein the identified aspect is an aspect of the machines' state.

30. The method of claim 27 wherein the deterministic execution of the multithreaded program by each of the plurality of machines produces a journal detailing execution of the multithreaded program by the machine,
the method further comprising comparing at least a portion of the journal produced by each of the machines of the plurality,
and wherein identifying an aspect of the execution of the multithreaded program that differs between a pair of the machines in the plurality comprises identifying journal contents that diverge between the machines of the pair.

31. The method of claim 27 wherein the plurality of machines includes at least three machines, and wherein the identified aspect of the identified machine is identified based upon being less common among the machines of the plurality than the identified aspect of the machine of the pair that is not the identified machine.

* * * * *

UNITED STATES PATENT AND TRADEMARK OFFICE
CERTIFICATE OF CORRECTION

PATENT NO. : 8,453,120 B2  
APPLICATION NO. : 12/778058  
DATED : May 28, 2013  
INVENTOR(S) : Ceze et al.

Page 1 of 1

It is certified that error appears in the above-identified patent and that said Letters Patent is hereby corrected as shown below:

ON THE TITLE PAGE

Item (57), in column 2, in "Abstract", line 7, delete "Program" and insert -- program --, therefor.

On the page 2, Item (56), in column 1, under "Other Publications", line 15, delete "Mulitprocessor," and insert -- Multiprocessor, --, therefor.

On the page 2, Item (56), in column 1, under "Other Publications", line 38, delete "Debuggin" and insert -- Debugging --, therefor.

On the page 2, Item (56), in column 2, under "Other Publications", line 10, delete "Impelmentation," and insert -- Implementation, --, therefor.

IN THE SPECIFICATION

In column 7, line 18, delete "It in" and insert -- It is --, therefor.

Signed and Sealed this  
Twentieth Day of October, 2015

Michelle K. Lee  
*Director of the United States Patent and Trademark Office*